United States Patent
Kong et al.

(10) Patent No.: US 11,785,567 B2
(45) Date of Patent: Oct. 10, 2023

(54) METHOD AND APPARATUS FOR DETERMINING SEARCH WINDOW AND SSB BITMAP

(71) Applicant: QUALCOMM Incorporated, San Diego, CA (US)

(72) Inventors: Ting Kong, San Diego, CA (US); Yongle Wu, San Diego, CA (US); Yong Li, San Diego, CA (US); Jun Zhu, San Diego, CA (US); Raghu Narayan Challa, San Diego, CA (US); Linzhe Li, San Diego, CA (US); Aparna Narayanan, Redwood City, CA (US); Uzma Khan Qazi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 41 days.

(21) Appl. No.: 17/244,708

(22) Filed: Apr. 29, 2021

(65) Prior Publication Data

US 2021/0345275 A1 Nov. 4, 2021

Related U.S. Application Data

(60) Provisional application No. 63/018,225, filed on Apr. 30, 2020.

(51) Int. Cl.
*H04W 56/00* (2009.01)
(52) U.S. Cl.
CPC .............. *H04W 56/0015* (2013.01)
(58) Field of Classification Search
CPC ............. H04W 24/10; H04W 56/0015
(Continued)

(56) References Cited

U.S. PATENT DOCUMENTS

2021/0160798 A1* 5/2021 Zheng ............. H04W 36/08
2021/0328733 A1* 10/2021 Zhang ............ H04L 5/0037
(Continued)

FOREIGN PATENT DOCUMENTS

EP      3471296 A1    4/2019
WO   2019193194 A1   10/2019

OTHER PUBLICATIONS

International Search Report and Written Opinion—PCT/US2021/030284—ISA/EPO—dated Aug. 12, 2021.

*Primary Examiner* — Robert J Lopata
(74) *Attorney, Agent, or Firm* — Procopio, Cory, Hargreaves & Savitch LLP/Qualcomm Incorporated

(57) ABSTRACT

A UE is configured to determine a set of parameters associated with receiving the SSBs, the set of parameters including a first parameter bitmap associated with a serving cell, a second parameter bitmap associated with the neighbor cell, and the SMTC. The UE is configured to determine a search window for searching the received SSBs based on the SMTC and at least one of the first parameter bitmap or the second parameter bitmap. The UE may measure the SSBs searched during the determined search window and send measurement results associated with at least a subset of the measured SSBs to the base station. The UE may also prune measurements to generate the measurement results by removing measurements associated with SSBs received in slots that are not indicated to expect SSBs, based on the first parameter bitmap, the second first parameter bitmap, or the SMTC.

33 Claims, 12 Drawing Sheets

(58) Field of Classification Search
USPC .......................................................... 370/350
See application file for complete search history.

(56) References Cited

U.S. PATENT DOCUMENTS

| | | | |
|---|---|---|---|
| 2022/0167222 A1* | 5/2022 | Zheng | H04W 56/001 |
| 2022/0167290 A1* | 5/2022 | Harada | H04L 5/0007 |
| 2022/0232493 A1* | 7/2022 | Harada | H04W 72/0406 |

* cited by examiner

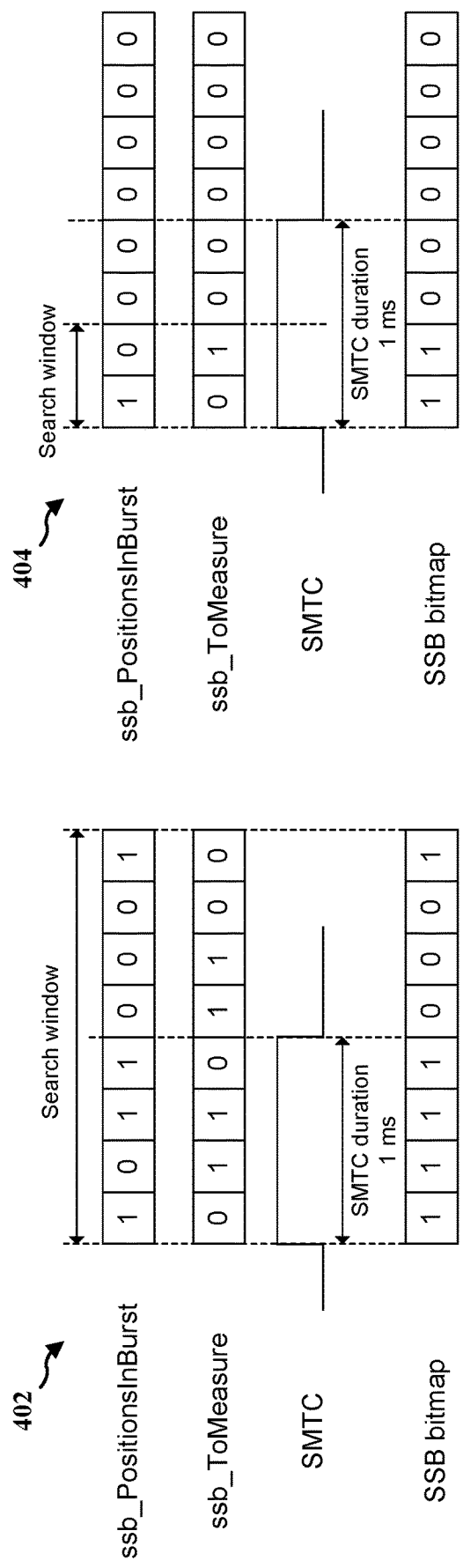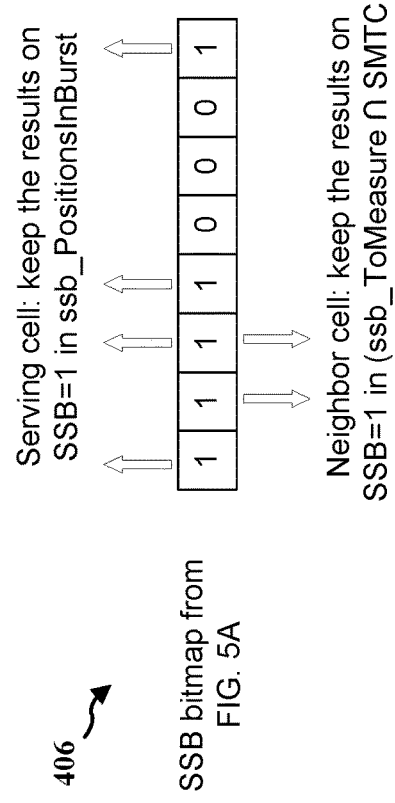
FIG. 4A
FIG. 4B
FIG. 4C

METHOD AND APPARATUS FOR DETERMINING SEARCH WINDOW AND SSB BITMAP

CROSS REFERENCE TO RELATED APPLICATION(S)

This application claims the benefit of U.S. Provisional Application Ser. No. 63/018,225, entitled "METHOD AND APPARATUS FOR DETERMINING SEARCH WINDOW AND SSB BITMAP" and filed on Apr. 30, 2020, which is expressly incorporated by reference herein in its entirety.

BACKGROUND

Technical Field

The present disclosure relates generally to communication systems, and more particularly, to a method of generating a synchronization signal block (SSB) bitmap and determining a search window to search for the SSBs.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In 5G NR, search and measurement processes performed by the UE are important processes for receiving signals. One of the initial steps during the search and measurement process for receiving signals, the UE generates a SSB bitmap and determines a search window for searching for SSBs received from a serving cell and/or a neighbor cell. To improve the mobility performance, the power performance, and the robustness of the UE and the communication between the UE and BS, there is a need for an improvement in the process of generating the SSB bitmap and the process of determining the search window.

In an aspect of the disclosure, a method, a computer-readable medium, and an apparatus are provided. The apparatus may be the UE. The UE may determine a set of parameters associated with receiving the SSBs, the set of parameters including a first parameter bitmap associated with the serving cell, a second parameter bitmap associated with neighbor cells, and an SSB measurement timing configuration (SMTC). The UE may determine a search window for searching received SSBs based on the SMTC and at least one of the first parameter bitmap $P_1$ or the second parameter bitmap $P_2$. The bits in each of the first parameter bitmap $P_1$ and the second parameter bitmap $P_2$ may indicate whether SSBs are expected in particular slots. The UE may then measure the SSBs searched during the determined search window and send measurement results associated with at least a subset of the measured SSBs to the base station.

In one aspect, the at least one neighbor cell may be synchronized with the serving cell, and the search window may be determined based on an SSB bitmap, the SSB bitmap being based on each of the first parameter bitmap $P_1$, the second parameter bitmap $P_2$, and the SMTC. The SSB bitmap may be determined based on $P_1 \cup (P_2 \cap SMTC)$. In another aspect, the at least one neighbor cell may not be synchronized with the serving cell, and the search window may be determined based on each of the first parameter bitmap $P_1$ and the SMTC. The search window may be determined based on at least one of the first parameter bitmap $P_1$ or the SMTC.

The UE may also be configured to prune the measurements associated with SSBs that are not expected by certain cells. In one aspect, at least one neighbor cell may be synchronized with the serving cell, and the measurements associated with the measured SSBs may be pruned by removing the measurements associated with SSBs received from the serving cell in slots that are not indicated to expect SSBs based on the first parameter bitmap $P_1$, and removing the measurements associated with SSBs received from the at least one neighbor cell in slots that are not indicated to expect SSBs based on the intersection of the second parameter bitmap $P_2$ and the SMTC ($P_2 \cap SMTC$). In another aspect, at least one neighbor cell may not be synchronized with the serving cell, and measurements associated with the measured SSB may be pruned by removing measurements associated with SSBs received from the serving cell in slots that are not indicated to expect SSBs based on the first parameter bitmap $P_1$, and removing measurements associated with SSBs received from the at least one neighbor cell in slots that are not indicated to expect SSBs based on the second parameter bitmap $P_2$.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B illustrate examples of the SSB bitmap generation, and FIG. 4C illustrates an example of the pruning process.

DETAILED DESCRIPTION

Figure 1:
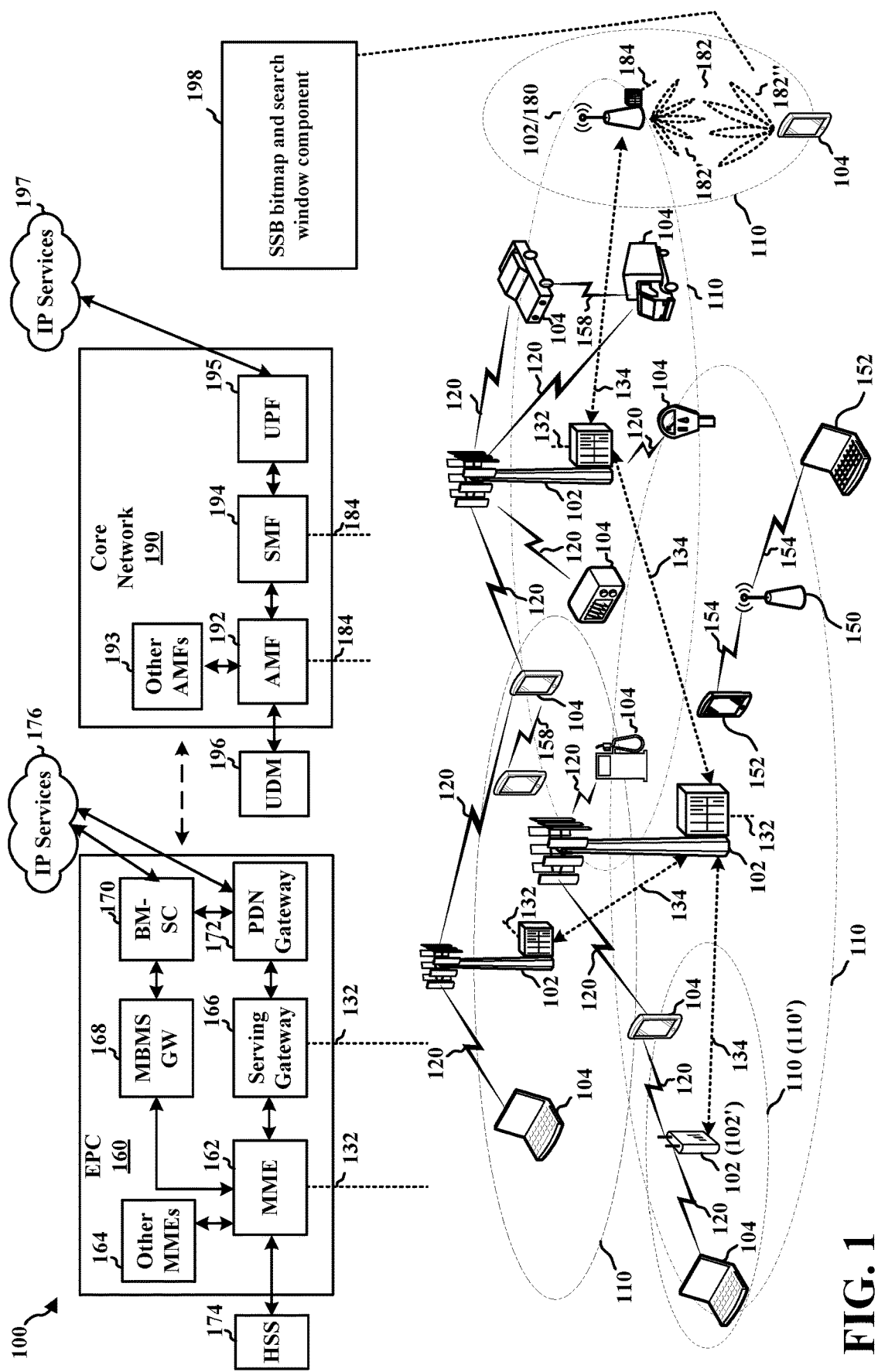
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an SSB bitmap and search window component 198 configured to determine a set of parameters associated with receiving SSBs, the set of parameters including at least one of a first parameter bitmap $P_1$ associated with a serving cell, a second parameter bitmap $P_2$ associated with at least one neighbor cell, or an SMTC, determine a search window for searching the received SSBs based on the SMTC and at least one of the first parameter bitmap $P_1$ or the second parameter bitmap $P_2$, measure SSBs searched during the determined search window, and sending, to a base station, measurement results associated with at least a subset of the measured SSBs. Although the following description may be focused on 5G NR, the concepts described herein may be applicable to other similar areas, such as LTE, LTE-A, CDMA, GSM, and other wireless technologies.

Figure 2:
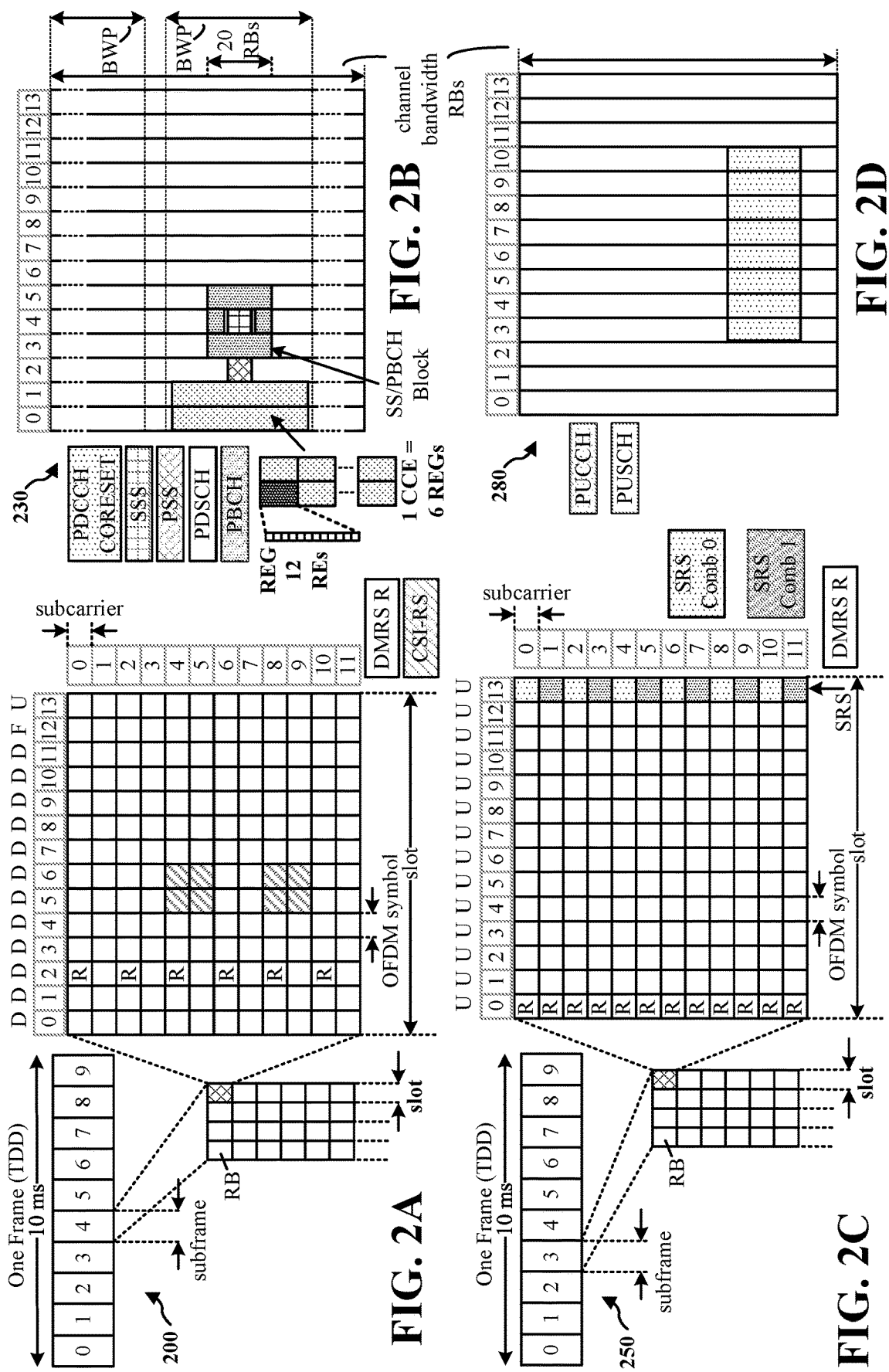
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
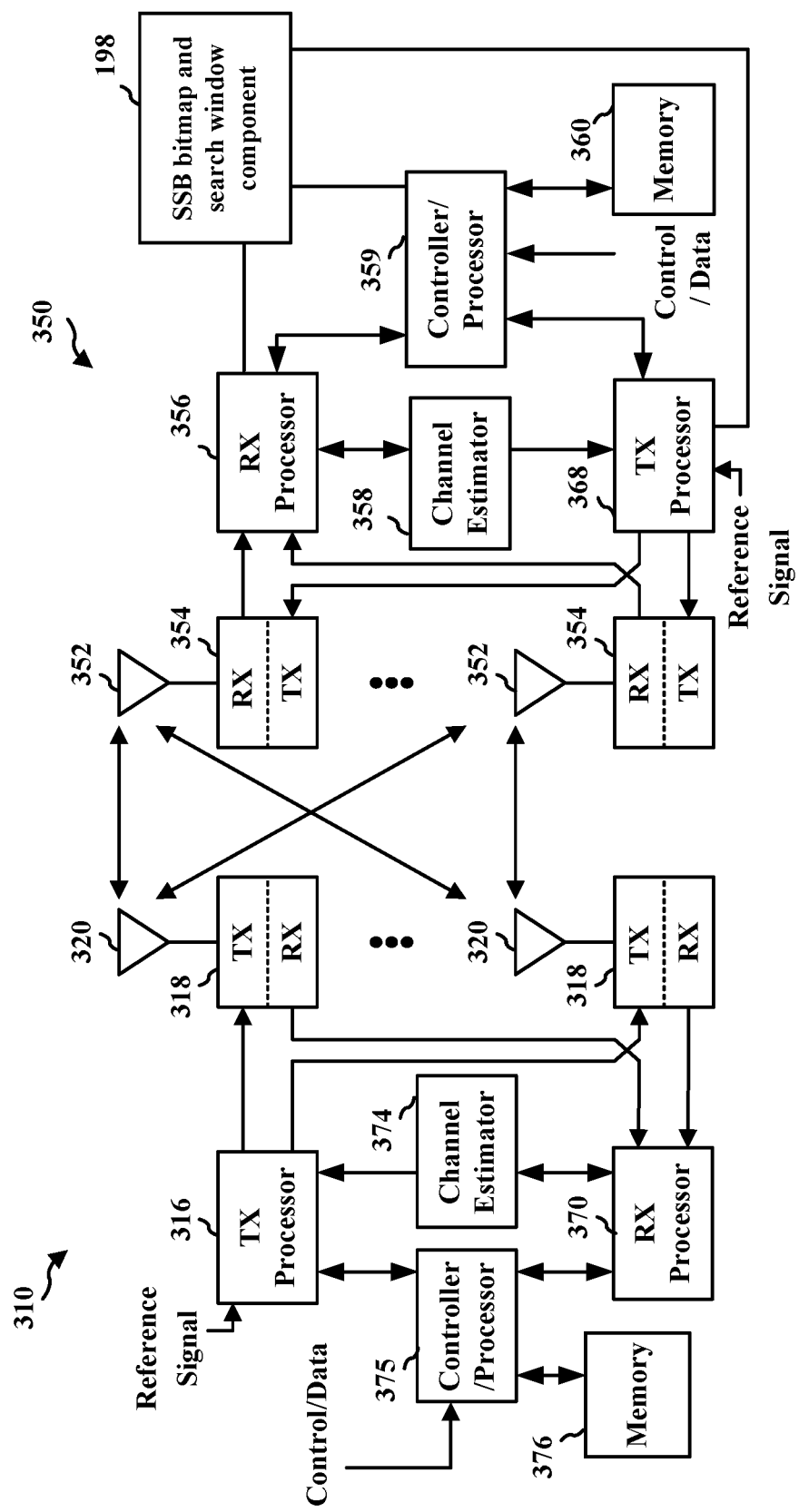
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

5G NR may include search and measurement procedures for both the sub-6 GHz (Sub6) spectrum and the mmWave spectrum. The search and measurement procedure may include determining a search window and an SSB bitmap as one of the initial steps. That is, in 5G NR, a UE may receive SSBs and perform a procedure of generating the SSB bitmap and determining the search window, which may be a part of the search for and measurement of signal candidates for synchronization of and configuration of the communication links with the base station. The procedure to determine the search window and the SSB bitmap may impact the mobility performance, the power performance, and the robustness of the UE. That is, improving the scheme of generating the SSB bitmap and determining the search window of the UE may improve the performance and the robustness of the UE, which may also improve the reliability of the communication links. The UE may rely on various parameters configured in the network (NW) to determine the search window and the SSB bitmap. In one aspect, a first parameter, i.e., ssb_PositionsInBurst, may indicate the time-domain position of active SSBs in the SS Burst Set of the serving cell. In another aspect, a second parameter, i.e., ssb_ToMeasure, may indicate the time-domain position of active SSBs in the SS Burst Set of at least one neighbor cell. In another aspect, the base station may provide the UE with an SMTC period.

The ssb_PositionsInBurst parameter may be a bitmap indicating the SSBs that are broadcasted by the serving cell of the UE. The ssb_ToMeasure parameter may be a bitmap indicating the SSBs that are broadcasted by one or more neighbor cells of the UE. The SMTC may specify a time-domain window with a duration and a location for the UE to detect and measure at least one cell, including the serving cell and the one or more neighbor cells of the UE. That is, the UE may measure the cells within the SMTC period or window. For example, the SMTC may have the following attributes: an SMTC window duration of 1, 2, 3, 4, or 5 ms; an SMTC periodicity of 5, 10, 20, 40, 80, or 160 ms; and an SMTC window timing offset of 0, 1, . . . , or (SMTC periodicity−1) ms.

The search window and the SSB bitmap in the UE may cover all the SSBs from both the serving cells and the neighbor cells of the UE, and the search window may be reduced in duration to save the power of the UE or improve the power management of the UE. In one aspect, the NW, including the base station, may configure the ssb_ToMeasure parameter and/or the SMTC parameter. In another aspect, the NW may not configure the ssb_ToMeasure and/or the SMTC, and the UE may not receive the ssb_ToMeasure and/or the SMTC from the base station. If ssb_ToMeasure is not configured by the base station, the UE may assume that all SSBs may need to be measured. If SMTC is not configured by the base station, the UE may assume that the SMTC window of the maximum duration of 5 ms. However, such assumptions may result in a power inefficiency in the UE. That is, by simply assuming that all the SSBs may need to be measured and the SMTC window has the maximum length of 5 ms, the search and measurement procedure of the UE may not be efficient, which may result in increased power consumption in the UE.

Referring to 198 of FIG. 1, the UE may implement certain relationships among the ssb_PositionsInBurst, the ssb_ToMeasure, and the SMTC. In certain aspects, the SMTC may cover all SSBs (ssb_PositionsInBurst and ssb_ToMeasure) that are broadcast by NW cells, including the serving cell of the UE and the one or more neighbor cells. However, the UE may also need to cover the ssb_PositionsInBurst and the ssb_ToMeasure SSBs configured by the NW and not covered by the SMTC period. That is, the SMTC configured by the NW may not cover all the SSBs indicated by the ssb_PositionsInBurst parameter and the ssb_ToMeasure parameter, and the UE may implement an algorithm to cover the SSBs that are not covered by the SMTC but indicated by the ssb_PositionsInBurst parameter and the ssb_ToMeasure parameter. Accordingly, the UE may generate the SSB bitmap as (ssb_PositionsInBurst)∪(ssb_ToMeasure∩SMTC), and determine the search window based on the generated SSB bitmap. The search window may extend from a first slot indicated in the SSB bitmap for measuring the SSBs to a last slot indicated in the SSB bitmap for measuring the SSBs.

According to certain aspects of the present disclosure, the UE may reduce performance degradation and search failures despite misleading NW configurations. That is, aspects of the present disclosure may provide a more robust design of the UE that may improve the performance of the UE and avoid search failures which may be caused by the bad NW configurations. Examples illustrating various aspects to address the above potential issues are provided below.

In certain aspects, the UE may determine the search window and/or the SSB bitmap based on the available information provided by the NW to increase the performance of the UE and the robustness of the overall network environment.

FIGS. 4A and 4B illustrate examples 402 and 404 of the SSB bitmap generation and FIG. 4C illustrates an example of the pruning process 406. The examples in FIGS. 4A, 4B, and 4C may illustrate the sub-6 GHz spectrum signal with 30 kHz subcarrier spacing configuration, and two slots may be included per 1 ms. However, the embodiments are not necessarily limited thereto, and any format or configuration of numerology and subcarrier spacing of 5G/NR may be implemented as long as it is applicable.

The examples 402, 404, and 406 of FIGS. 4A, 4B, and 4C illustrate that the serving cell and one or more neighbor cells may be synchronized with each other. The base station may signal the UE to indicate that the network, including the serving cell and one or more neighbor cells, is a synchronous network. For example, the base station may signal "deriveSSB-IndexFromCell=true" in a system information block type 2 (SIB2) to the UE to indicate that the network is synchronous. The serving cell and one or more neighbor cells are synchronized with each other, and the boundaries of the frame or slots of the signals from the serving cell and one or more neighbor cells may be aligned in time. Accordingly, the UE may generate the SSB bitmap based on the ssb_PositionsInBurst, the ssb_ToMeasure, and/or the SMTC period.

In some aspects, the UE may generate the SSB bitmap based on the ssb_PositionsInBurst, the ssb_ToMeasure, and the SMTC. The UE may receive, from the base station, the ssb_PositionsInBurst, the ssb_ToMeasure, and the SMTC in the SIB2. The ssb_PositionsInBurst may be configured by the NW, and the ssb_ToMeasure or the SMTC may be optionally configured by the NW. The UE may determine the ssb_PositionsInBurst, the ssb_ToMeasure, and the SMTC based on the configuration of the ssb_PositionsInBurst, the ssb_ToMeasure, and the SMTC in the SIB2. The NW may not configure the ssb_ToMeasure and the SMTC, and the UE may determine the ssb_ToMeasure and the SMTC based on a preconfigured rule.

The UE may generate the SSB bitmap as (ssb_PositionsinBurst)∪(ssb_ToMeasure∩SMTC), and the search window may extend from a first slot indicated in the SSB bitmap for measuring the SSBs to the last slot indicated in the SSB bitmap for measuring the SSBs. Accordingly, the search window may be determined as SMTC±x slot(s).

The intersection of the ssb_ToMeasure and the SMTC (ssb_ToMeasure∩SMTC) may provide that SSBs outside of the applicable SMTC from the neighbor cells are not to be measured. The intersection operation may cover the SSBs broadcast by neighbor cells while minimizing the window duration to reduce power consumption. Furthermore, the union of the intersection of the ssb_ToMeasure and the SMTC with the ssb_PositionsInBurst may ensure that the SSBs from the UE 902 serving cell are measured.

Referring to FIG. 4A, the ssb_PositionsInBurst may be represented by a bitmap of 10110001, the ssb_ToMeasure may be represented by a bitmap of 01101100, and the SMTC period may have a 1 ms of duration with 0 ms of offset. The SMTC may be represented by a bitmap of 11110000. According to the SSB bitmap generation of (ssb_PositionsinBurst)∪(ssb_ToMeasure∩SMTC), the UE may generate the SSB bitmap of 11110001. The UE may determine the search window based on the generated SSB bitmap. The search window may extend from the first slot to the fourth slot (extending to cover from the first bit to the eighth bit of the SSB bitmap), and the UE may determine that the search window is a certain duration, e.g., 2 ms, with a certain offset, e.g., 0 ms, extending for a certain amount of slots, e.g., four (4) slots. Comparing the determined search window with the SMTC duration of 1 ms for two slots, the UE may determine that the search window covers two slots more than the SMTC (SMTC+2 slots).

Referring to FIG. 4B, the ssb_PositionsInBurst may have a bitmap of 10000000, the ssb_ToMeasure may have a bitmap of 01000000, and the SMTC may have a 1 ms duration with a 0 ms offset. The SMTC may be represented by a bitmap of 11110000. According to the SSB bitmap generation of (ssb_PositionsinBurst)∪(ssb_ToMeasure∩SMTC), the UE may generate the SSB bitmap of 11000000. The search window can extend for the first slot (extending to cover the first and second bits of the SSB bitmap), and the UE may determine that the search window is 0.5 ms with 0 ms offset, extending for the first slot. Comparing the determined search window with the SMTC duration of 1 ms for two slots, the UE may determine that the search window covers one slot less than the SMTC (SMTC−1 slot).

The UE may further process the SSBs measured within the search window based on at least one of the ssb_PositionsInBurst, the ssb_ToMeasure, the SMTC, or the SSB bitmap. In some aspects, the UE may prune the measurements in certain SSBs based on at least one of the ssb_PositionsInBurst, the ssb_ToMeasure, the SMTC, or the SSB bitmap. In one aspect, the UE may remove the measurements associated with the SSBs received from the serving cell in slots that are not indicated to expect SSBs based on the ssb_PositionsInBurst. In another aspect, the UE may remove the measurements associated with the SSBs received from one or more neighbor cells in slots that are not indicated to expect SSBs based on an intersection of the second parameter bitmap P2 and the SMTC, i.e., ssb_ToMeasure∩SMTC.

Referring to FIG. 4C, the SSB bitmap may refer to the SSB bitmap in FIG. 4A. According to the outcome of the SSB bitmap generation and the search window determination of (ssb_PositionsinBurst)∪(ssb_ToMeasure∩SMTC), the UE may search for all the SSBs within the search window. The ssb_PositionsInBurst indicates that the SSBs from the serving cell and associated with the first, third, fourth, and eighth bits of the ssb_PositionsInBurst are to be measured, the measurements associated with the SSBs from the serving cell and associated with the second, fifth, sixth, and seventh bits of the ssb_PositionsInBurst may be discarded and not sent to the base station. Therefore, the UE may prune the measurements associated with the measured SSBs by deleting or removing measurements associated with the SSBs not expected by the serving cells that do not correspond with the ssb_PositionsInBurst. In a similar manner, since the (ssb_ToMeasure∩SMTC)=01100000 indicates that the SSBs from the neighbor cells and associated with the second and third bits of the (ssb_ToMeasure∩SMTC) are to be measured, the measurements associated with the SSBs from the neighbor cells and associated with the first, third, fourth, fifth, sixth, seventh, and eighth bits of the (ssb_ToMeasure∩SMTC) may be discarded or removed and not sent to the base station. Therefore, the UE may prune the measurements associated with the measured SSBs by deleting or removing the measurements associated with the SSBs not expected by the neighbor cells that do not correspond with the (ssb_ToMeasure∩SMTC).

Figure 5A:
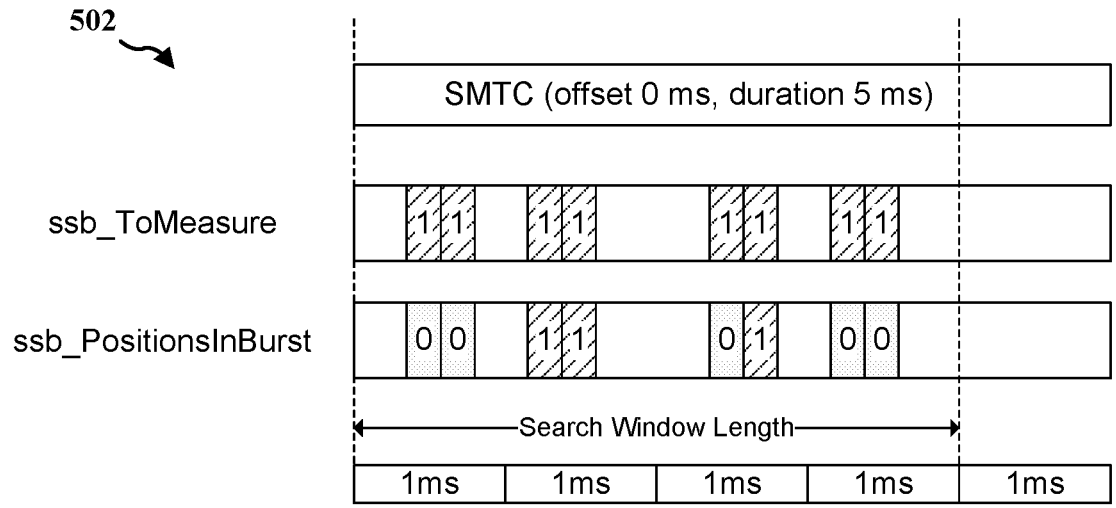
FIGS. 5A and 5B illustrate examples of determining a search window.
Figure 5B:
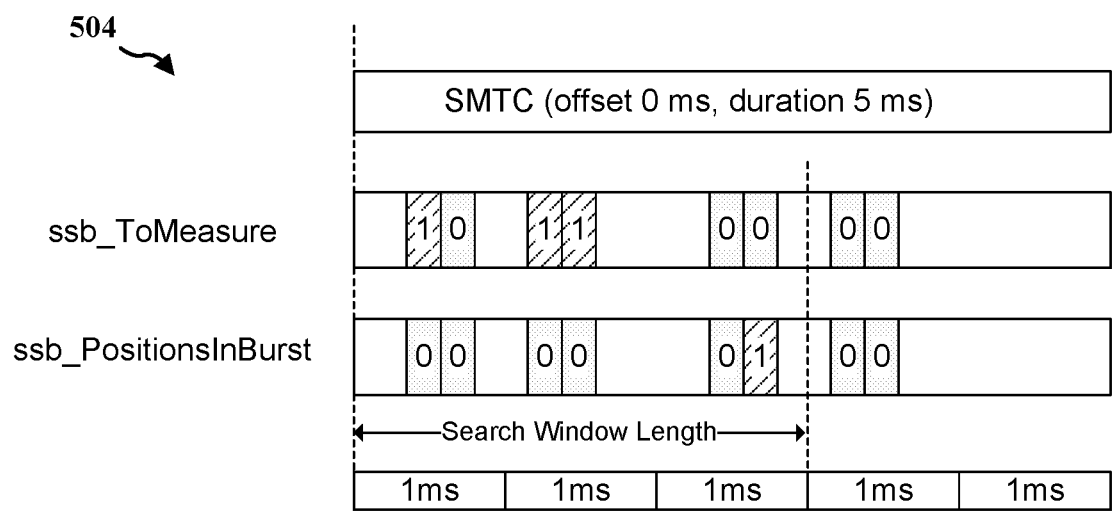

FIGS. 5A and 5B illustrate examples 502 and 504 of determining the search window. The examples 502 and 504 of the FIGS. 5A and 5B may illustrate the sub-6 GHz spectrum signal with 15 kHz subcarrier spacing configuration, and one slot may be included per 1 ms. However, the embodiments are not necessarily limited thereto, and any format or configuration of numerology and subcarrier spacing of 5G/NR may be implemented as long as it is applicable.

Referring to the example 502 illustrated in FIG. 5A, the base station may configure the ssb_PositionsInBurst but not the ssb_ToMeasure, and the UE may determine the ssb_PositionsInBurst as received from the base station. Accordingly, the UE may determine that the ssb_ToMeasure is 11111111 (corresponding to the maximum value for the bitmap) and the SMTC has a duration of 5 ms with an offset of 0 ms (which corresponds to the maximum duration), which may be represented by a bitmap of 11111111. Since the ssb_PositionsInBurst has a bitmap of 00110100, according to the SSB bitmap generation of (ssb_PositionsinBurst)∪(ssb_ToMeasure∩SMTC), the UE may generate the SSB bitmap of 11111111. Accordingly, the search window can extend from the first slot to the fourth slot (extending to cover from the first bit to the eighth bit of the SSB bitmap), and the UE may determine that the search window has a length of 4 ms with 0 ms offset, extending for four slots. Comparing the determined search window with the SMTC duration of 5 ms for five slots with an offset of 0 ms, the UE can determine that the search window covers one slot less than the SMTC, i.e., SMTC−1 slot. The UE may save power by reducing the search window length or duration to 4 ms.

Referring to the example 504 illustrated in FIG. 5B, the base station may configure the ssb_PositionsInBurst and the ssb_ToMeasure, and the UE may determine the ssb_PositionsInBurst and the ssb_ToMeasure as received from the base station. The UE may determine that the SMTC has a duration of 5 ms with an offset of 0 ms (which corresponds to the maximum duration), which may be represented by a bitmap of 11111111. The ssb_PositionsInBurst has a bitmap of 00110100, and the ssb_ToMeasure has a bitmap of 10110000, according to the SSB bitmap generation of (ssb_PositionsInBurst)∪(ssb_ToMeasure∩SMTC), the UE may generate the SSB bitmap of 10110100. Accordingly, the search window can extend from the first slot to the third slot (extending to cover from the first bit to the sixth bit of the SSB bitmap), and the UE may determine that the search window has a length of 3 ms with 0 ms offset, extending for 3 slots. Comparing the determined search window with the SMTC duration of 5 ms for 5 slots with an offset of 0 ms, the UE can determine that the search window covers 2 slots less than the SMTC, i.e., SMTC−2 slots. Therefore, the UE may save power by reducing the search window duration to 3 ms.

Figure 6A:
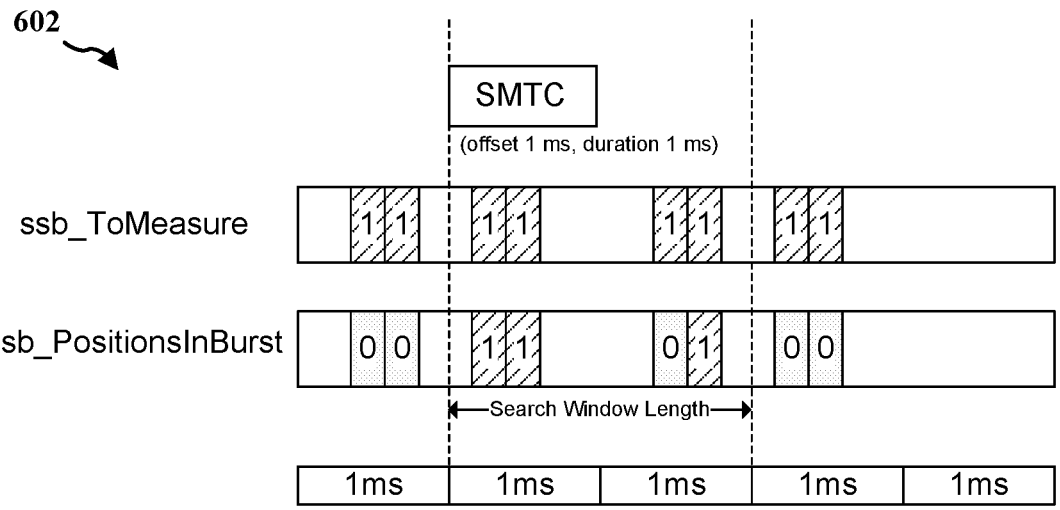
FIGS. 6A and 6B illustrate examples of determining a search window.
Figure 6B:
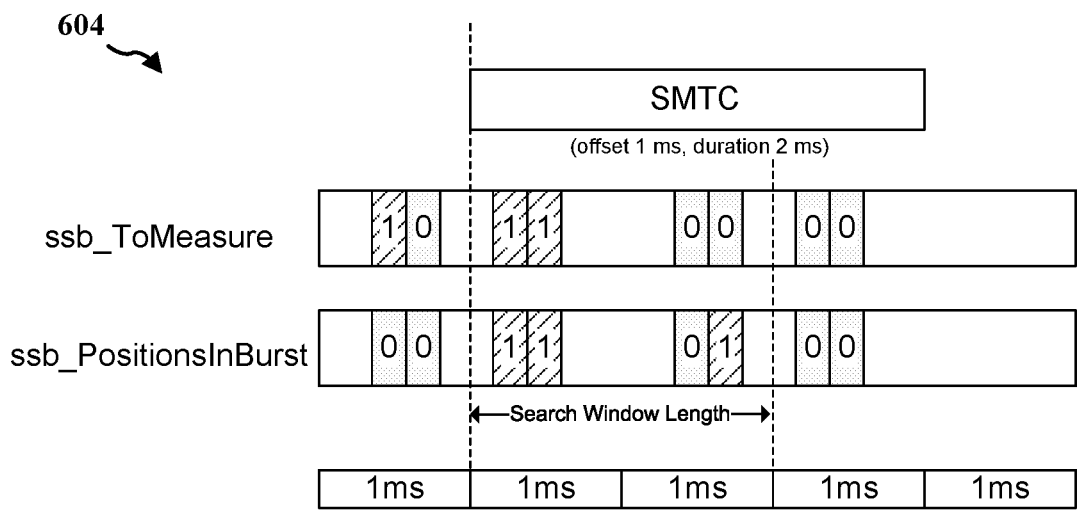

FIGS. 6A and 6B illustrate examples 602 and 604 of determining the search window. The examples 602 and 604 in the FIGS. 6A and 6B illustrate the sub-6 GHz spectrum signal with a 15 kHz subcarrier spacing configuration, and one slot may be included per 1 ms. However, the embodiments are not necessarily limited thereto, and any format or configuration of numerology and subcarrier spacing of 5G/NR may be implemented as long as it is applicable.

Referring to the example 602 illustrated in FIG. 6A, the base station may configure the ssb_PositionsInBurst and SMTC, and the UE may determine the ssb_PositionsInBurst and the SMTC as received from the base station. Accordingly, the UE may determine that the ssb_ToMeasure is 11111111 (corresponding to the maximum value for the bitmap). Since the ssb_PositionsInBurst has a bitmap of 00110100 and the SMTC has a duration of 1 ms with an offset of 1 ms, which may be represented by a bitmap of 00110000, according to the SSB bitmap generation of (ssb_PositionsinBurst)∪(ssb_ToMeasure∩SMTC), the UE may generate the SSB bitmap of 00110100. Accordingly, the search window can extend from the second slot to the third slot (extending to cover from the third bit to the sixth bit of the SSB bitmap), and the UE may determine that the search window has a length of 2 ms with a 1 ms offset, extending for 2 slots. Comparing the determined search window with the SMTC duration of 1 ms for 1 slot with an offset of 1 ms, the UE may determine that the search window covers 1 slot more than the SMTC, i.e., SMTC+1 slot. Therefore, the UE may save power by reducing search window duration to 2 ms without losing serving cell active SSB.

Referring to the example 604 illustrated in FIG. 6B, the base station may configure the ssb_PositionsInBurst, the ssb_ToMeasure, and the SMTC, and therefore, the UE may determine ssb_PositionsInBurst, the ssb_ToMeasure, and the SMTC as received from the base station. Accordingly, the UE may determine that the ssb_PositionsInBurst has a bitmap of 00110100, the ssb_ToMeasure has a bitmap of 10110000, and the SMTC has a duration of 3 ms with an offset of 1 ms, which may be represented by a bitmap of 00111111. According to the SSB bitmap generation of (ssb_PositionsinBurst)∪(ssb_ToMeasure∩SMTC), the UE may generate the SSB bitmap of 00110100. Accordingly, the search window can extend from the second slot to the third slot, extending to cover from the third bit to the sixth bit of the SSB bitmap. The UE may determine that the search window has a length of 2 ms with a 1 ms offset, extending for 2 slots. Comparing the determined search window with the SMTC duration of 3 ms for 3 slots with an offset of 1 ms, the UE can determine that the search window covers 1 slot less than the SMTC, i.e., SMTC−2 slots. Therefore, the UE may save power by reducing the search window duration to 2 ms and suspend the UE from searching SSBs from an irrelevant neighbor cell.

Figure 7A:
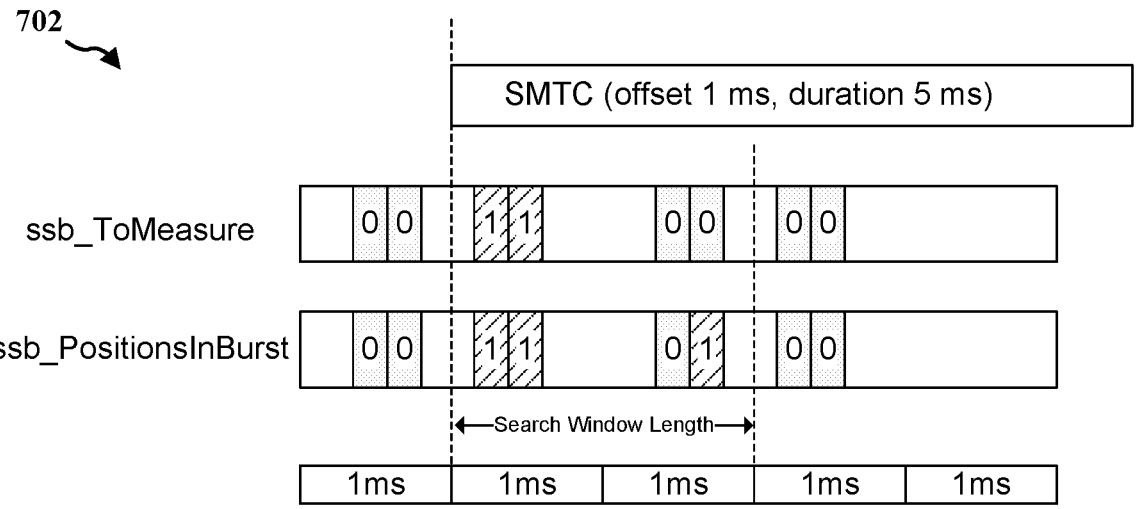
FIGS. 7A and 7B illustrate examples of determining a search window.
Figure 7B:
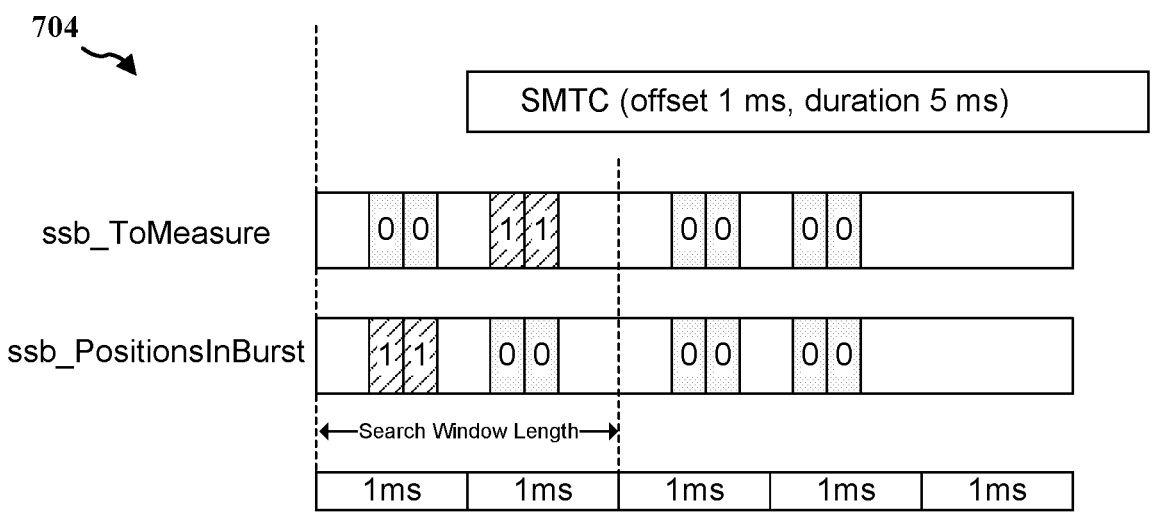

FIGS. 7A and 7B illustrate examples 702 and 704 of determining the search window. FIGS. 7A and 7B may provide examples of bad network configurations from the base station and illustrate how the UE may reduce the search window while not degrading the performance. The examples 702 and 704 in the FIGS. 7A and 7B illustrate the sub-6 GHz spectrum signal with 15 kHz subcarrier spacing configuration, and one slot may be included per 1 ms. However, the embodiments are not necessarily limited thereto, and any format or configuration of numerology and subcarrier spacing of 5G/NR may be implemented as long as it is applicable.

Referring to the example 702 illustrated in FIG. 7A, the base station may configure the ssb_PositionsInBurst, the ssb_ToMeasure, and the SMTC, and the UE may determine ssb_PositionsInBurst, the ssb_ToMeasure, and the SMTC as received from the base station. Accordingly, the UE may determine that the ssb_PositionsInBurst has a bitmap of 00110100, the ssb_ToMeasure has a bitmap of 00110000, and the SMTC has a duration of 5 ms with an offset of 1 ms, which may be represented by a bitmap of 00111111. According to the SSB bitmap generation of (ssb_PositionsinBurst)∪(ssb_ToMeasure∩SMTC), the UE may generate the SSB bitmap of 00111100. Accordingly, the search window can extend from the second slot to the third slot extending to cover from the third bit to the sixth bit of the SSB bitmap. The UE may determine that the search window has a length of 2 ms with 1 ms offset, extending for 2 slots. Comparing the determined search window with the SMTC duration of 5 ms for 5 slots with an offset of 1 ms, the UE can determine that the search window covers 3 slots less than the SMTC, i.e., SMTC−3 slots.

The SMTC configuration as described above is allowed for 5G/NR, but such a configuration may not be a suitable configuration, which may mislead a conventional UE to perform a search with a 5 ms to 6 ms duration (5 ms to cover SMTC or 6 ms to cover both bitmap and SMTC). That is, without the generation of the SSB bitmap and determination of the search window illustrated in FIG. 4A or 4B, the above configuration from the base station may mislead the conventional UE to search for 5 ms to cover SMTC or 6 ms to cover both the parameter bitmaps and the SMTC. Accordingly, the conventional UE may waste power searching during the duration when no SSBs are expected to be detected. However, the UE may save power by reducing the search window length to 2 ms without a degradation in the performance of the UE.

Referring to the example 704 illustrated in FIG. 7B, the base station may configure the ssb_PositionsInBurst, the ssb_ToMeasure, and the SMTC, and the UE may determine ssb_PositionsInBurst, the ssb_ToMeasure, and the SMTC as received from the base station. Accordingly, the UE may determine that the ssb_PositionsInBurst has a bitmap of 11000000, the ssb_ToMeasure has a bitmap of 00110000, and the SMTC has a duration of 5 ms with an offset of 1 ms, which may be represented by a bitmap of 00111111. According to the SSB bitmap generation of (ssb_PositionsinBurst)∪(ssb_ToMeasure∩SMTC), the UE may generate the SSB bitmap of 11110000. Accordingly, the search window can extend from the first slot to the second slot, extending to cover from the first bit to the fourth bit of the SSB bitmap. The UE may determine that the search window has a length of 2 ms with a 0 ms offset, extending for 2 slots. Comparing the determined search window with the SMTC duration of 5 ms for 5 slots with an offset of 1 ms, the UE can determine that the search window covers 3 slots less than the SMTC, i.e., SMTC−3 slots.

The above case depicted in FIG. 7B is another bad configuration from the base station in which a report from a conventional UE may show that the SMTC fails to cover the broadcast serving cell SSBs. The conventional UE may be misled and skip searching during the first millisecond window of potential search time for SSBs, which may cause the conventional UE to lose the synchronization with the serving cell and declare radio link failure (RLF) with the base station. That is, since the above SMTC configuration from the base station does not cover all the broadcast serving cell SSBs, without the generation of the SSB bitmap and determination of the search window, the conventional UE may be misled to skip searching during the first millisecond window of potential search time for SSBs. Therefore, the conventional UE may determine that it is losing synchronization with the severing cell and falsely declare the RLF signal to the base station. Accordingly, the conventional UE may waste power searching during the duration in which no SSBs are expected to be detected. On the other hand, the UE, as illustrated in FIG. 4A or 4B may save power by reducing the search window length from 5 ms to 2 ms and improve the performance of the UE.

Figure 8A:
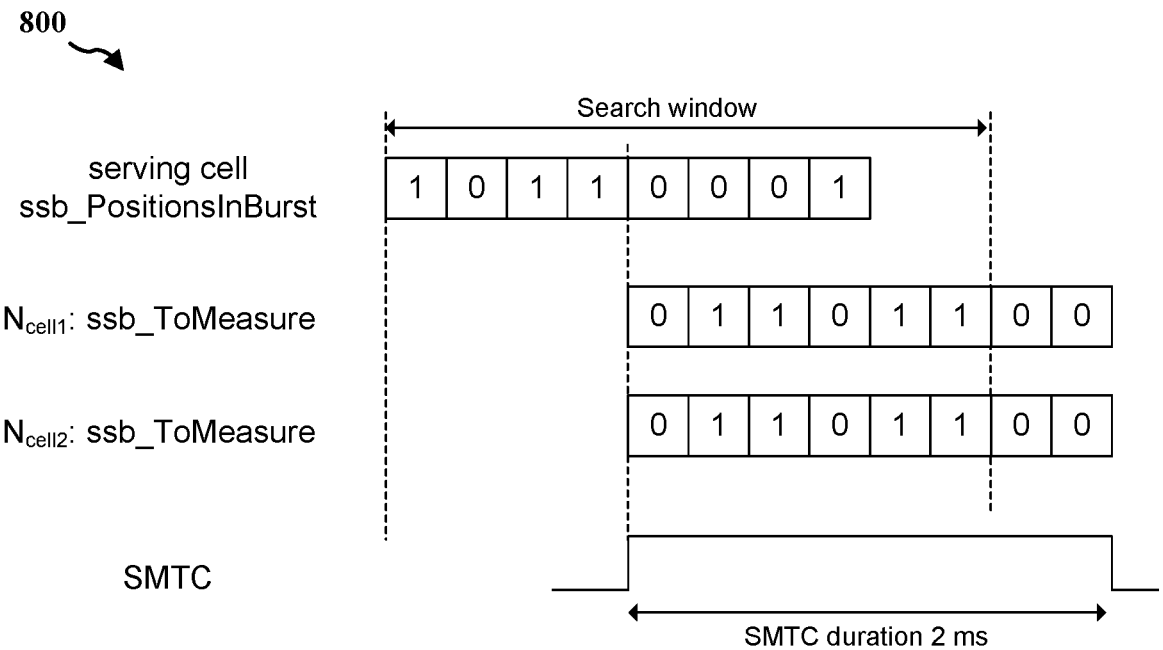
FIGS. 8A and 8B illustrate examples of determining a search window.
Figure 8B:
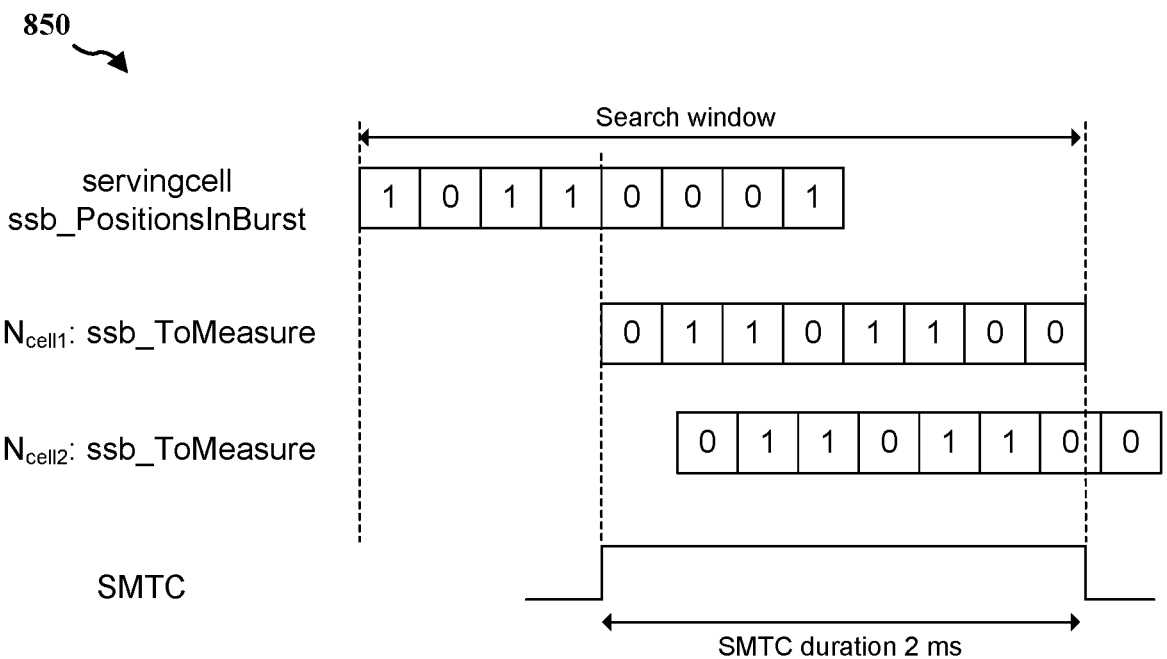

FIGS. 8A and 8B illustrate examples 800 and 850 of determining the search window. The first example 800 of FIG. 8A illustrates the synchronous network, including the serving cell, a first neighbor cell, and a second neighbor cell. That is, the serving cell, the first neighbor cell, and the second neighbor cell may be synchronized with each other. The base station may signal the UE to indicate that the network, including the serving cell and one or more neighbor cells, is the synchronous network. For example, the base station may signal "deriveSSB-IndexFromCell=true" in the SIB2 to the UE to indicate that the network is synchronous. The serving cell and one or more neighbor cells are synchronized with each other, and the boundaries of the frame or slots of the signals from the serving cell and one or more neighbor cells may be aligned in time. Accordingly, the UE may generate the SSB bitmap based on the ssb_PositionsInBurst, the ssb_ToMeasure, and/or the SMTC period.

The UE may generate the SSB bitmap as (ssb_PositionsinBurst)∪(ssb_ToMeasure∩SMTC), the UE may determine the search window based on the SSB bitmap. Accordingly, the search window may extend from the first slot of the ssb_PositionsinBurst of the serving cell to the sixth slot of the ssb_ToMeasure of the neighbor cells, including the first neighbor cell and the second neighbor cell.

On the other hand, the second example 850 of FIG. 8B illustrates an asynchronous network, including the serving cell, a first neighbor cell, and a second neighbor cell. That is, the serving cell, the first neighbor cell, and the second neighbor cell may not be synchronized with each other. The base station may signal the UE to indicate that the network, including the serving cell and one or more neighbor cells, is the asynchronous network. For example, the base station may signal "deriveSSB-IndexFromCell=false" in the SIB2 to the UE to indicate that the network is asynchronous. Since the serving cell and one or more neighbor cells may not be synchronized with each other, and the boundaries of the frame or slots of the signals from the serving cell and one or more neighbor cells may not be aligned with each other in time. Accordingly, the UE may not generate the SSB bitmap based on the ssb_PositionsInBurst, the ssb_ToMeasure, and/or the SMTC period.

The UE on the asynchronous network may not determine the search window based on the SSB bitmap. Accordingly, the UE on the asynchronous network may determine the search window as SMTC+y slots that may include both the ssb_PositionsinBurst and the SMTC. That is, the UE may determine the search window to extend to include ssb_PositionsinBurst∪SMTC. In one aspect, the search window may extend from a first slot indicated in the union of the first parameter bitmap and the SMTC for measuring the SSB to the last slot indicated in the union of the first parameter bit map and the SMTC for measuring the SSBs. Here, the UE may determine the search window to extend from the first slot of the ssb_PositionsInBurst to the end of the SMTC, i.e., SMTC+4 slots. Accordingly, the UE on the asynchronous network may be less efficient than the UE on the synchronous network to accommodate the asynchronous cells.

For processing, e.g., pruning, the measured results in certain SSBs, the UE on the asynchronous network may prune the measurements associated with each neighbor cell based on its ssb_ToMeasure at its own timing. That is, the UE may prune measurements associated with SSBs by keeping the measurements associated with the SSBs that are measured on the serving cell that correspond to 1 in the ssb_PositionsInburst. For each neighbor cell, the UE may keep the measurements associated with the measured SSBs in on the neighbor cells that correspond to 1 in the ssb_ToMeasure. In one aspect, the UE may remove the measurements associated with the SSBs received from the serving cell in slots that are not indicated to expect SSBs based on the ssb_PositionsinBurst. In another aspect, the UE may remove the measurements associated with the SSBs received from at least one neighbor cell in slots that are not indicated to expect SSBs based on the ssb_ToMeasure.

Figure 9:
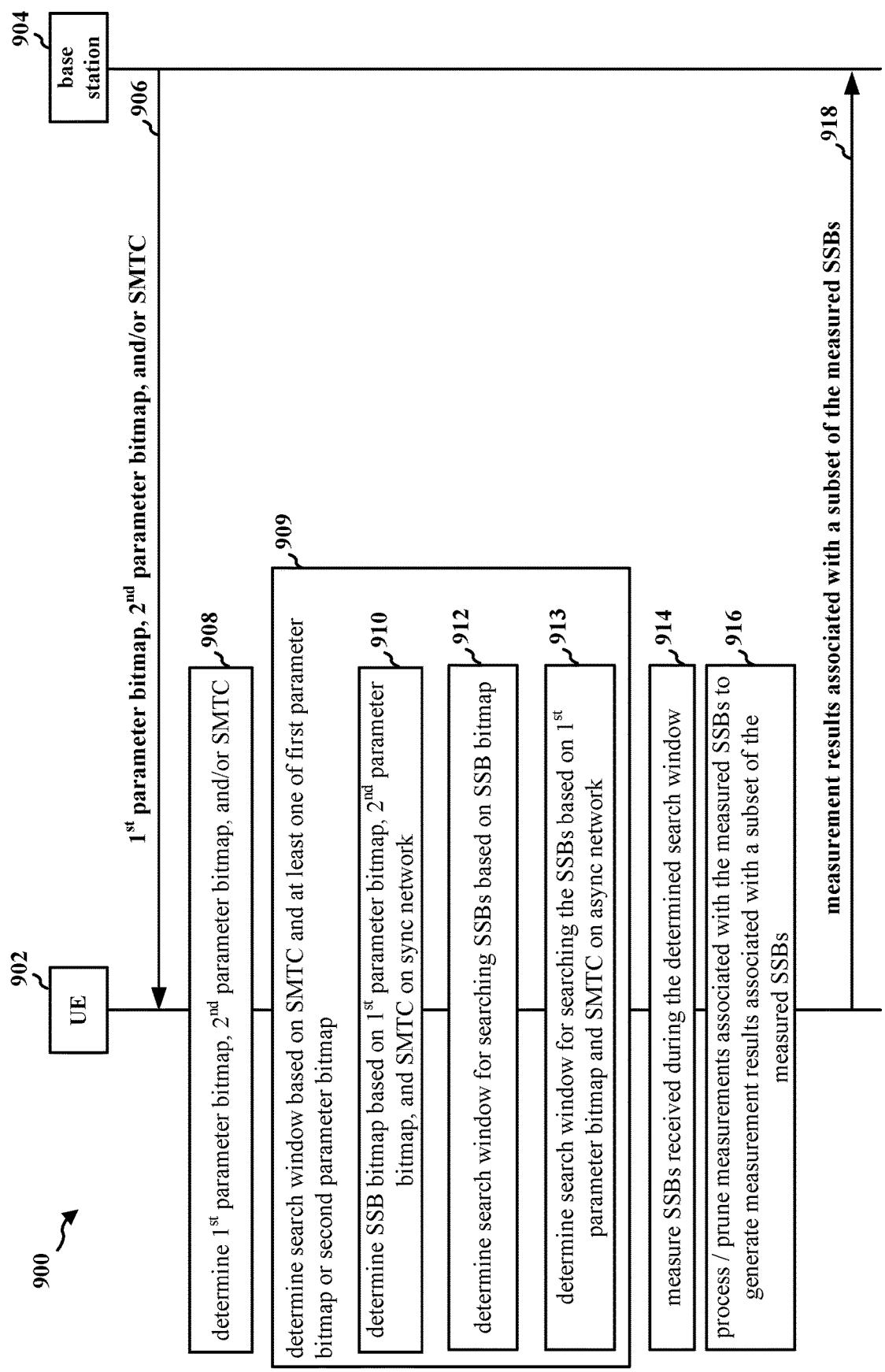
FIG. 9 is a call diagram of a method of wireless communication.

FIG. 9 is a call diagram 900 of a method of wireless communication. The call diagram 900 includes a UE 902 and a base station 904, and the UE 902 may perform the example process of searching and measuring the SSBs received from the base station 904.

At 906, the UE 902 may receive, from the base station 904, at least one of the following parameters: a $1^{st}$ parameter bitmap, a $2^{nd}$ parameter bitmap, and/or an SMTC period associated with the SSBs. Here, the $1^{st}$ parameter bitmap may be the ssb_PositionsInBurst, and the $2^{nd}$ parameter bitmap may be the ssb_ToMeasure. The ssb_PositionsInBurst may be configured by the NW, and the ssb_ToMeasure or the SMTC may be optionally configured by the NW. The UE 902 may receive at least one of the ssb_PositionsInBurst, the ssb_ToMeasure, or the SMTC. That is, the base station 904 may configure the ssb_PositionsInBurst, and also optionally configure the ssb_ToMeasure and the SMTC. The UE 902 may receive the ssb_PositionsInBurst, the ssb_ToMeasure, and the SMTC in the SIB2.

At 908, the UE 902 may determine the $1^{st}$ parameter bitmap, the $2^{nd}$ parameter bitmap, and the SMTC period. The $1^{st}$ parameter bitmap may be the ssb_PositionsInBurst and the $2^{nd}$ parameter bitmap may be the ssb_ToMeasure. In one aspect, the base station 904 may configure all of the ssb_PositionsInBurst, the ssb_ToMeasure, and the SMTC, and the UE 902 may determine the ssb_PositionsInBurst, the ssb_ToMeasure, and the SMTC as configured by the NW. If the UE 902 does not receive the ssb_ToMeasure and/or the SMTC, the UE 902 determines the maximum value of each parameter not received as the default value for that parameter. For example, when the base station 904 does not transmit the ssb_ToMeasure to the UE 902, the UE 902 may determine that all the received SSBs may be measured (the maximum value for ssb_ToMeasure). When the base station 904 does not transmit the SMTC to the UE 902, the UE 902 may determine that the SMTC has a 5 ms duration (the maximum value for SMTC).

In other words, the UE 902 may receive some parameters associated with the received SSBs at 906, and the received parameters may include the ssb_PositionsInBurst, the ssb_ToMeasure, and the SMTC. The ssb_ToMeasure and the SMTC may be optionally configured by the base station 904, and therefore, the base station 904 may solely transmit the ssb_PositionsInBurst, and the UE 902 may solely receive the ssb_PositionsInBurst.

At 909, the UE 902 may determine a search window for searching the received SSBs based on the SMTC and at least one of the first parameter bitmap or the second parameter bitmap determined at 908. The 909 may include 910, 912, and 913.

At 910, the network may be the synchronous network including at least one neighbor cell synchronized with the serving cell, and the UE 902 may determine an SSB bitmap based on each of the $1^{st}$ parameter bitmap, the $2^{nd}$ parameter bitmap, and/or the SMTC period as determined by the UE 902. The UE 902 may determine the SSB bitmap based on the ssb_PositionsInBurst or an intersection of the ssb_ToMeasure and the SMTC (ssb_ToMeasure∩SMTC). The UE 902 may determine the SSB bitmap based on a union of the ssb_PositionsInBurst and the intersection of the ssb_ToMeasure and the SMTC. That is, the SSB bitmap may be determined according to the following formula: ssb_PositionsInBurst∪(ssb_ToMeasure∩SMTC). The base station 904 may notify the UE 902 that the network is the synchronous network. For example, the parameter "deriveSSB-IndexFromCell=true" in the SIB2 may indicate that the network is the synchronous network.

The intersection of the ssb_ToMeasure and the SMTC (ssb_ToMeasure∩SMTC) may provide that regardless of the value of ssb_ToMeasure, SSBs outside of the applicable SMTC from the neighbor cells are not to be measured. The intersection operation may cover the SSBs broadcast by neighbor cells while minimizing the window duration to reduce power consumption. Furthermore, the union of the intersection of the ssb_ToMeasure and the SMTC with the ssb_PositionsInBurst may ensure that the SSBs from the UE 902 serving cell are measured.

At 912, the UE 902 may determine the search window for searching the SSBs on the synchronous network based on the SSB bitmap determined based on each of the first parameter bitmap, the second parameter bitmap, and the SMTC. That is, the UE 902 may determine that the search window extends in time from the first slot of the SSB bitmap indicated for measuring SSBs to the last slot the SSB bitmap indicates for measuring SSBs. According to the determination of the search window duration, the search window may be SMTC±x slots to cover the SSBs configured to be 1 in the SSB bitmap. That is, the search window may be determined by the UE 902 to include fewer slots than the SMTC specifies, the same number of slots as the SMTC specifies, or a greater number of slots than the SMTC specifies based on the SSB bitmap.

At 913, the network may be the asynchronous network including at least one neighbor cell not synchronized with the serving cell, and the UE 902 may determine the search window based on each of the first parameter bitmap and the SMTC. The UE 902 may determine to include a union of the first parameter bitmap $P_1$ or the SMTC, i.e., $P_1 \cup SMTC$. The search window may extend to include the first parameter bitmap $P_1$ and the SMTC. The base station 904 may notify the UE 902 that the network is an asynchronous network. For example, the parameter "deriveSSB-IndexFromCell=false" in the SIB2 may indicate that the UE network is an asynchronous network.

At 914, the UE 902 may measure the SSBs received during the determined search window. That is, the UE 902 may measure all the SSBs received within the determined search window. For a synchronous network, the search window may be determined at 912 based on the SSB bitmap determined based on each of the first parameter bitmap, the second parameter bitmap, and the SMTC at 910. For an asynchronous network, the search window may be determined based on each of the first parameter bitmap and the SMTC at 913.

At 916, the UE 902 may process/prune the measurements associated with the SSBs based on at least one of the first parameter bitmap, the second parameter bitmap, the SMTC or the SSB bitmap to generate the measurement results associated with at least the subset of the measured SSBs. The UE 902 may be configured to prune the measurements associated with the SSBs at 914 based on the ssb_PositionsInBurst, the ssb_ToMeasure, and/or the SMTC to generate the measurement results associated with at least the subset of the measured SSBs which are sent to the base station 904. Particularly, based on the measured results, the database may prune the measurements associated with the SSBs received in slots that are not indicated to expect any SSB for the corresponding cells.

In one aspect, the UE 902 may be on the synchronous network and measure the SSBs based on the search space determined at 912 based on the SSB bitmap determined at 910. The UE may prune the measurements associated with the measured SSBs based on the ssb_PositionsInBurst, the ssb_ToMeasure, and the SMTC. For example, database may keep the measurements associated with SSBs from the serving cell that corresponds with value of 1 in ssb_PositionsInBurst, and keep the measurements associated with SSBs from the neighbor cell results that corresponds with value of 1 in (ssb_ToMeasure∩SMTC). That is, the ssb_PositionsInBurst and the ssb_ToMeasure may respectively indicate whether SSBs may be expected in particular slots, and the UE 902 may be configured to prune the measurements associated with the measured SSBs according to the ssb_PositionsInBurst and the ssb_ToMeasure. For example, a value of 1 in a particular bit of the ssb_PositionsInBurst and the ssb_ToMeasure may indicate that the SSB is expected from the corresponding cell, and a value of 0 may indicate that no SSB is expected from the corresponding cell. The UE 902 may remove the measurements associated with SSBs received from a serving cell in slots that are not expected by the serving cell based on the ssb_PositionsInBurst, and remove the measurements associated with the SSBs received from the neighbor cells in slots that are not expected by the neighbor cells based on the intersection of the ssb_ToMeasure and the SMTC (ssb_ToMeasure∩SMTC).

In another aspect, the UE 902 may be on the asynchronous network and measured the SSBs based on the search space determined at 913 based on the first parameter bitmap and the second parameter bitmap. The UE may prune measurements associated with the measured SSBs based on the ssb_PositionsInBurst and the ssb_ToMeasure to generate the measurement results associated with a subset of the measured SSBs. For example, the database may keep the measurements associated with SSBs from the serving cell that corresponds with value of 1 in ssb_PositionsInBurst, and keep the measurements associated with SSBs from the neighbor cell that correspond with value of 1 in ssb_ToMeasure for each neighbor cell. That is, the ssb_PositionsInBurst and the ssb_ToMeasure may respectively indicate whether SSBs may be expected in particular slots, and the UE 902 may be configured to prune the measurements associated with the measured SSBs according to the ssb_PositionsInBurst and the ssb_ToMeasure. For example, a value of 1 in a particular bit of the ssb_PositionsInBurst and the ssb_ToMeasure may indicate that the SSB is expected from the corresponding serving cell and neighbor cell, and a value of 0 may indicate that no SSB is expected from the corresponding serving cell and neighbor cell. The UE 902 may remove the measurements associated with the SSBs received from a serving cell in slots that are not expected by the serving cell based on the ssb_PositionsInBurst, and remove the measurements associated with the SSBs received from the neighbor cells in slots that are not expected by the neighbor cells based on the ssb_ToMeasure.

At 918, the UE 902 may send the measurement results associated with a subset of the measured SSBs. The base station 904 and the UE 902 may further schedule the communication based on the measurement results sent from the UE 902 to the base station 904.

Throughout the disclosure, the bitmap of the parameters uses a particular value to indicate whether the SSB is expected from the serving cell and/or the neighbor cell. Particularly, the value of 1 is used to indicate that the SSB is expected from the corresponding cell, and the value of 0 is used to indicate that the SSB is not expected from the corresponding cell. However, the embodiments are not necessarily limited thereto, and any value may be implemented for the parameter bitmap as long as it is applicable.

Figure 10A:
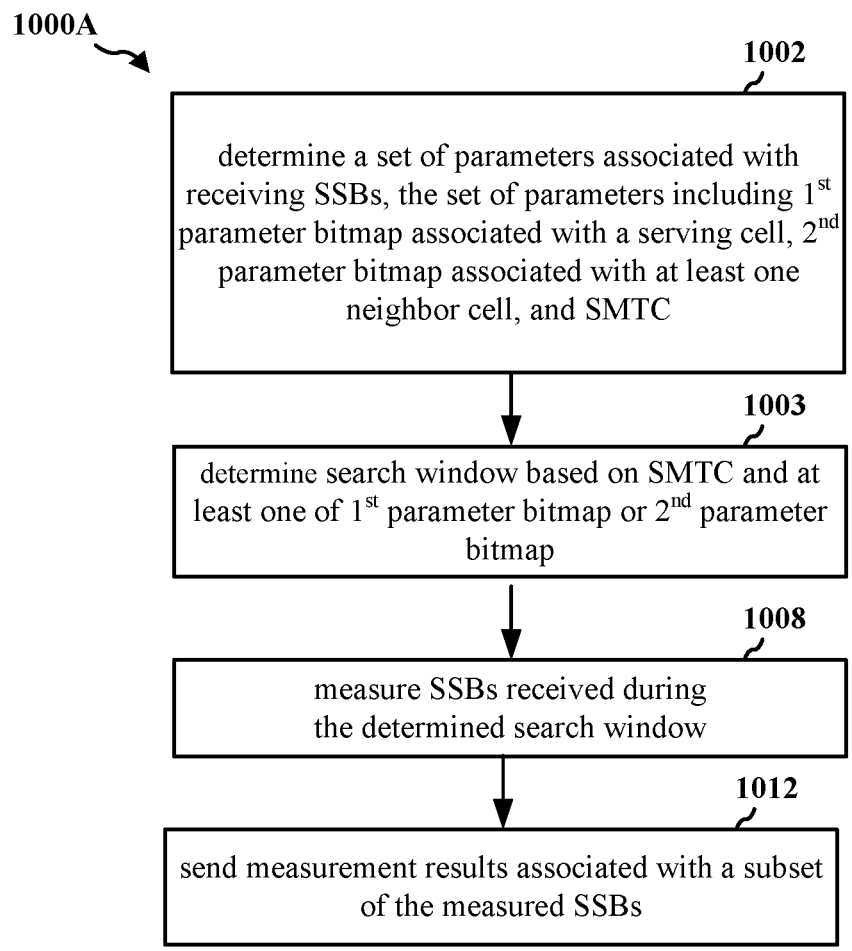
FIGS. 10A and 10B are flowcharts of a method of wireless communication.
Figure 10B:
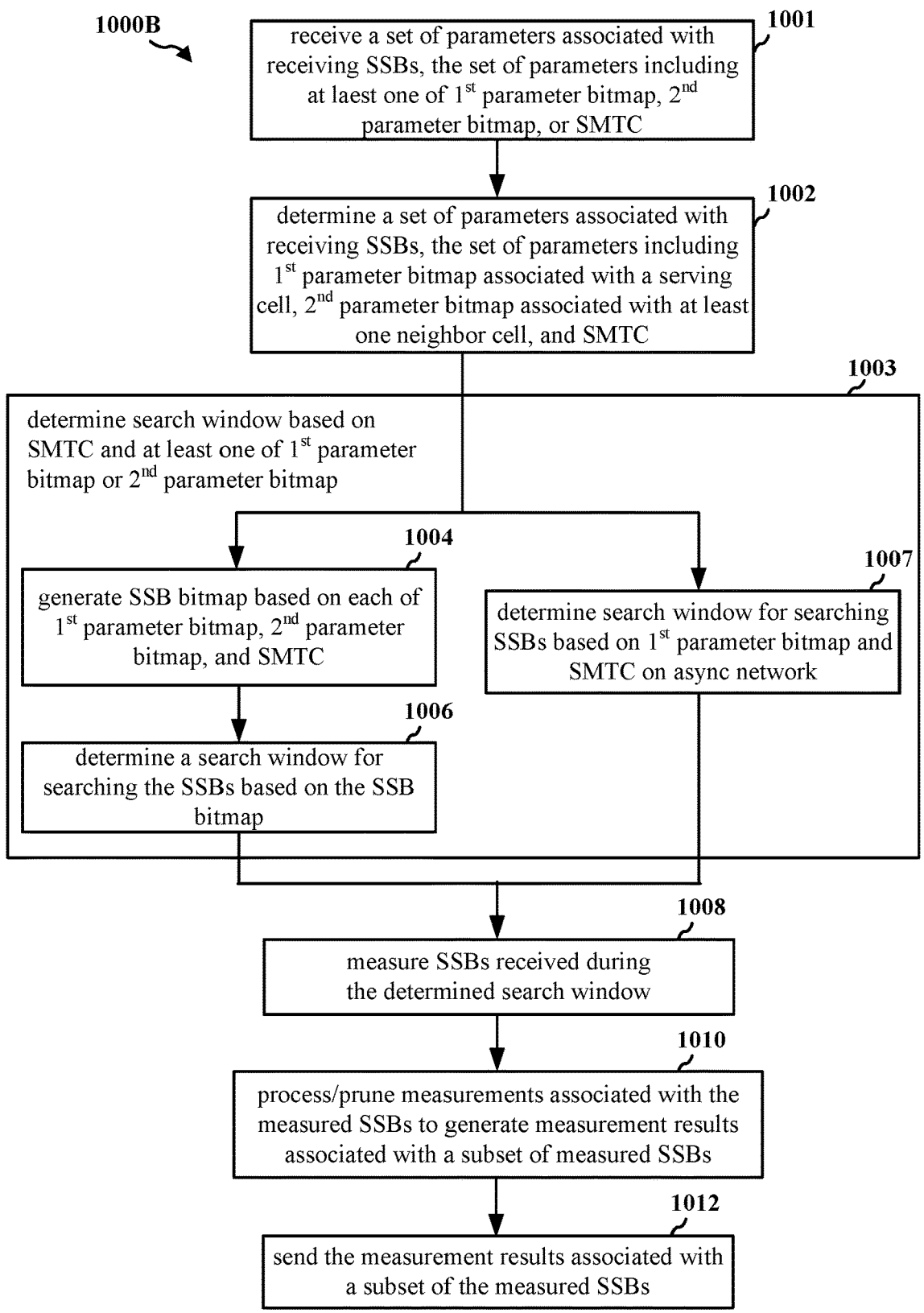

FIGS. 10A and 10B are flowcharts 1000A and 1000B of a method of wireless communication. The method may be performed by a UE (e.g., the UE 104/350/902, apparatus 1102). The UE may search and measure SSBs received from a base station based on a set of parameters.

At 1001, the UE may receive the set of parameters associated with the SSBs, and the set of parameters may include at least one of a first parameter bitmap, a second parameter bitmap, or an SMTC period. In some aspects, the first parameter bitmap may be a ssb_PositionsInBurst parameter, and the second parameter bitmap may be a ssb_ToMeasure parameter received from the base station. The ssb_ToMeasure and the SMTC may be optionally configured by the base station, and the base station may transmit the ssb_PositionsInBurst without the ssb_ToMeasure and the SMTC. In other words, the UE may receive the ssb_PositionsInBurst, and may optionally receive the ssb_ToMeasure and/or the SMTC. For example, at 906 of FIG. 9, the UE 902 may receive, from the base station 904, the following parameters: a $1^{st}$ parameter bitmap, a $2^{nd}$ parameter bitmap, and/or an SMTC period associated with the SSBs. Furthermore, 1001 may be performed by an SSB search window parameter managing component 1140.

At 1002, the UE may determine the set of parameters associated with receiving SSBs, the set of parameters including the first parameter bitmap associated with the serving cell, the second parameter bitmap associated with at least one neighbor cell, and the SMTC. In some aspects, the first parameter bitmap may be a ssb_PositionsInBurst parameter, and the second parameter bitmap may be a ssb_ToMeasure parameter received from the base station. The UE may receive the ssb_PositionsInBurst parameter, the ssb_ToMeasure parameter, and the SMTC from the base station and the UE may determine the first parameter bitmap based on the ssb_PositionsInBurst parameter, the ssb_ToMeasure parameter, and the SMTC received from the base station. For example, at 908 of FIG. 9, the UE 902 may determine the $1^{st}$ parameter bitmap, the $2^{nd}$ parameter bitmap, and the SMTC period. Furthermore, 1002 may be performed by the SSB search window parameter managing component 1140.

In some aspects, certain parameters may not be received from the base station. The UE may not receive the ssb_ToMeasure and/or the SMTC, and the UE may determine a maximum value for each parameter of the set of parameters that were not received as the default value. In one example, the base station may not configure and transmit the ssb_ToMeasure to the UE, and the UE may determine that all the received SSBs may be measured. In another example, the base station may not configure/transmit the SMTC to the UE, and the UE may determine that the SMTC has a 5 ms duration, i.e., the maximum duration.

At 1003, the UE may determine a search window for searching the received SSBs based on the SMTC and at least one of the first parameter bitmap or the second parameter bitmap determined at 1002. 1003 may include 1004, 1006, and 1007. For example, at 909 of FIG. 9, the UE 902 may determine a search window for searching the received SSBs based on the SMTC and at least one of the first parameter bitmap or the second parameter bitmap determined at 908. Furthermore, 1003 may be performed by the SSB search window parameter managing component 1140.

At 1004, the network may be the synchronous network including at least one neighbor cell synchronized with the serving cell, and the UE may determine an SSB bitmap based on each of the $1^{st}$ parameter bitmap, the $2^{nd}$ parameter bitmap, and/or the SMTC period as determined by the UE. The UE may determine the SSB bitmap based on the ssb_PositionsInBurst or an intersection of the ssb_ToMeasure and the SMTC (ssb_ToMeasure∩SMTC). The UE may determine the SSB bitmap based on a union of the ssb_PositionsInBurst and the intersection of the ssb_ToMeasure and the SMTC. That is, the SSB bitmap may be determined according to the following formula: ssb_PositionsInBurst∪(ssb_ToMeasure∩SMTC). The base station may notify the UE that the network is a synchronous network. For example, the parameter "deriveSSB-IndexFromCell=true" in the SIB2 may indicate that the network is the synchronous network. For example, at 910 of FIG. 9, the UE 902 may determine an SSB bitmap based on each of the $1^{st}$ parameter bitmap, the $2^{nd}$ parameter bitmap, and/or the SMTC period as determined by the UE 902. Furthermore, 1004 may be performed by an SSB bitmap component 1142.

At 1006, the UE may determine the search window for searching the SSBs on the synchronous network based on the SSB bitmap determined based on each of the first parameter bitmap, the second parameter bitmap, and the SMTC. The UE may determine that the search window has a time duration that extends in time from the first slot of the SSB bitmap indicated for measuring SSBs and the last slot the SSB bitmap indicated for measuring SSBs. That is, the search window may extend in time from the first slot of the SSB bitmap indicated for measuring SSBs to the last slot the SSB bitmap indicates for measuring SSBs. The search window may be determined by the UE to include fewer slots than the SMTC, the same number of slots as the SMTC, or a greater number of slots as the SMTC based on the SSB bitmap. According to the determination of the search window duration, the search window may be SMTC±x slots to cover the SSBs configured to be 1 in the SSB bitmap. That is, the search window may be determined by the UE 902 to include fewer slots than the SMTC specifies, the same number of slots as the SMTC specifies, or a greater number of slots than the SMTC specifies based on the SSB bitmap. For example, at 912 of FIG. 9, the UE 902 may determine the search window for searching the SSBs on the synchronous network based on the SSB bitmap determined based on each of the first parameter bitmap, the second parameter bitmap, and the SMTC. Furthermore, 1006 may be performed by the SSB search window parameter managing component 1140.

At 1007, the network may be an asynchronous network including at least one neighbor cell not synchronized with the serving cell, and the UE may determine the search window based on each of the first parameter bitmap and the SMTC. The UE 902 may determine to include a union of the first parameter bitmap $P_1$ or the SMTC, i.e., $P_1 \cup SMTC$. The search window may extend to include the first parameter bitmap $P_1$ and the SMTC. The base station 904 may notify the UE that the network is an asynchronous network. For example, the parameter "deriveSSB-IndexFromCell=false" in the SIB2 may indicate that the UE network is an asynchronous network. For example, at 913 of FIG. 9, the UE 902 may determine the search window based on each of the first parameter bitmap and the SMTC. Furthermore, 1007 may be performed by the SSB search window parameter managing component 1140.

At 1008, the UE may measure all the SSBs received within the search window determined at 1003. That is, the UE may measure all the SSBs received within the determined search window. For a synchronous network, the search window may be determined at 1006 based on the SSB bitmap determined based on each of the first parameter bitmap, the second parameter bitmap, and the SMTC at 1004. For an asynchronous network, the search window may be determined based on each of the first parameter bitmap and the SMTC at 1007. For example, at 914 of FIG. 9, the UE 902 may measure the SSBs received during the determined search window. Furthermore, 1008 may be performed by an SSB measuring component 1144.

At 1010, the UE may process/prune the measurements associated with the SSBs based on at least one of the first parameter bitmap, the second parameter bitmap, the SMTC, or the SSB bitmap to generate the measurement results associated with at least the subset of the measured SSBs. The UE may prune the measurements associated with the SSBs at 1008 based on the ssb_PositionsInBurst, the ssb_ToMeasure, and/or the SMTC to generate the measurement results associated with at least the subset of the measured SSBs which are sent to the base station 904. Particularly, based on the measured results, the database may prune the measurements associated with the SSBs received in slots that are not indicated to expect any SSB for the corresponding cells. For example, at 916 of FIG. 9, the UE 902 may process/prune the measured SSBs based on at least one of the first parameter bitmap, the second parameter bitmap, the SMTC, or the SSB bitmap. Furthermore, 1010 may be performed by an SSB measurement database managing component 1146.

In one aspect, the UE may be on the synchronous network and measure the SSBs based on the search space determined at 1006 based on the SSB bitmap determined at 1004. The UE may prune the measurements associated with the measured SSBs based on the ssb_PositionsInBurst, the ssb_ToMeasure, and the SMTC. For example, database may keep the measurements associated with SSBs from the serving cell that corresponds with value of 1 in ssb_PositionsInBurst, and keep the measurements associated with SSBs from the neighbor cell results that corresponds with value of 1 in (ssb_ToMeasure∩SMTC). That is, the ssb_PositionsInBurst and the ssb_ToMeasure may respectively indicate whether SSBs may be expected in particular slots, and the UE 902 may be configured to prune the measurements associated with the measured SSBs according to the ssb_PositionsInBurst and the ssb_ToMeasure. For example, a value of 1 in a particular bit of the ssb_PositionsInBurst and the ssb_ToMeasure may indicate that the SSB is expected from the corresponding cell, and a value of 0 may indicate that no SSB is expected from the corresponding cell. The UE may remove the measurements associated with SSBs received from a serving cell in slots that are not expected by the serving cell based on the ssb_PositionsInBurst, and remove the measurements associated with the SSBs received from the neighbor cells in slots that are not expected by the neighbor cells based on the intersection of the ssb_ToMeasure and the SMTC (ssb_ToMeasure∩SMTC).

In another aspect, the UE may be on the asynchronous network and may measure the SSBs based on the search space determined at 913 based on the first parameter bitmap and the second parameter bitmap. The UE may prune measurements associated with the measured SSBs based on the ssb_PositionsInBurst and the ssb_ToMeasure to generate the measurement results associated with a subset of the measured SSBs. For example, the database may keep the measurements associated with SSBs from the serving cell that corresponds with value of 1 in ssb_PositionsInBurst, and keep the measurements associated with SSBs from the neighbor cell that correspond with value of 1 in ssb_ToMeasure for each neighbor cell. That is, the ssb_PositionsInBurst and the ssb_ToMeasure may respectively indicate whether SSBs may be expected in particular slots, and the UE may be configured to prune the measurements associated with the measured SSBs according to the ssb_PositionsInBurst and the ssb_ToMeasure. For example, a value of 1 in a particular bit of the ssb_PositionsInBurst and the ssb_ToMeasure may indicate that the SSB is expected from the corresponding serving cell and neighbor cell, and a value of 0 may indicate that no SSB is expected from the corresponding serving cell and neighbor cell. The UE 902 may remove the measurements associated with the SSBs received from a serving cell in slots that are not expected by the serving cell based on the ssb_PositionsInBurst, and remove the measurements associated with the SSBs received from the neighbor cells in slots that are not expected by the neighbor cells based on the ssb_ToMeasure.

At 1012, the UE may send the measurement results associated with a subset of the measured SSBs. The base station and the UE may further schedule the communication based on the measurement results sent from the UE to the base station. For example, at 918 of FIG. 9, the UE 902 may send the measurement results associated with a subset of the measured SSBs. Furthermore, 1012 may be performed by an SSB measurement reporting component 1148.

Figure 11:
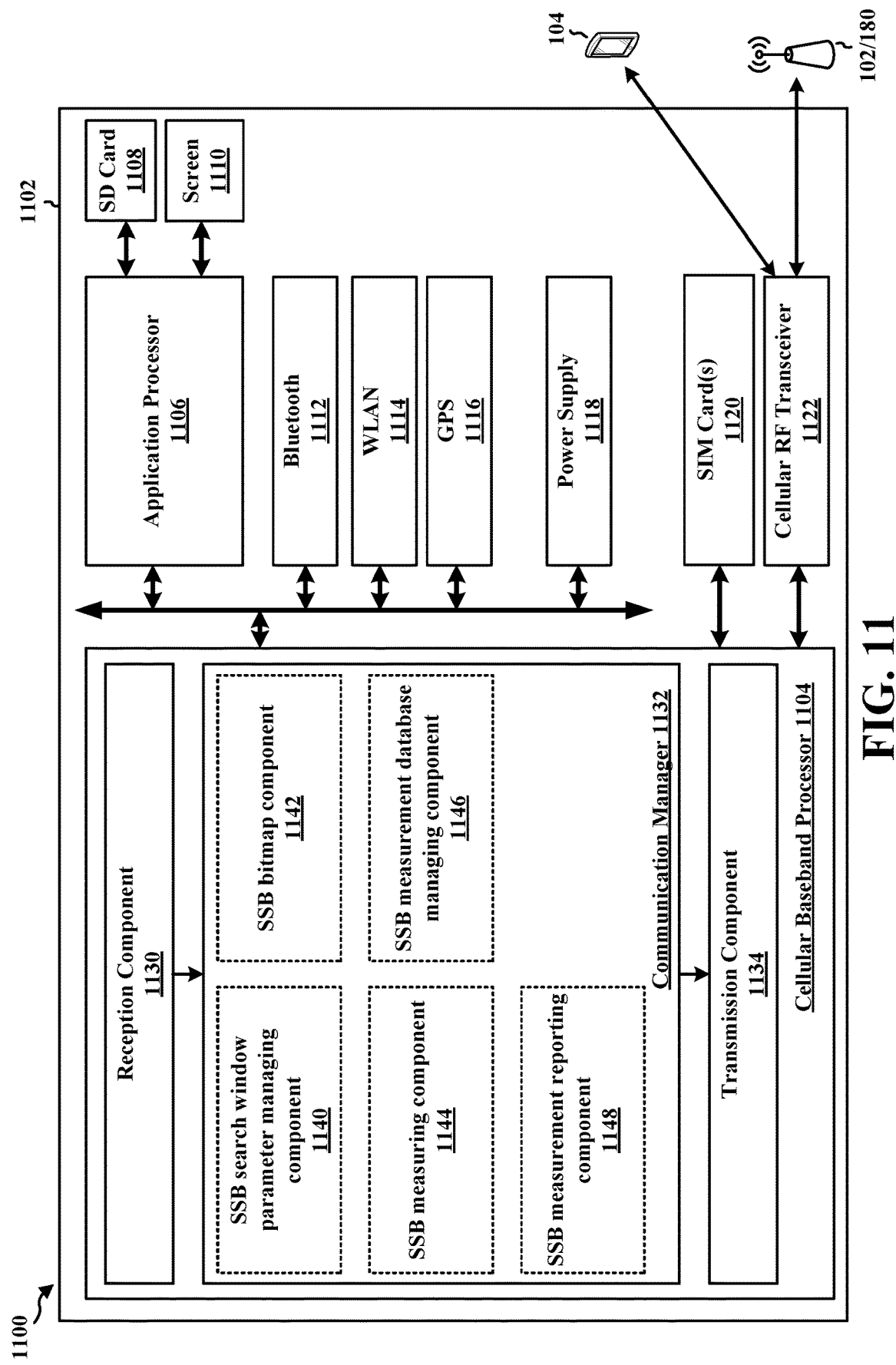
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/ memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an SSB search window parameter managing component 1140 that is configured to receive and determine the set of parameters associated with the SSBs, determine a search window for searching the received SSBs based on the SMTC and at least one of the first parameter bitmap or the second parameter bitmap, determine the search window for searching the SSBs on the synchronous network based on the SSB bitmap determined based on each of the first parameter bitmap, the second parameter bitmap, and the SMTC, and determine the search window based on each of the first parameter bitmap and the SMTC, e.g., as described in connection with 1001, 1002, 1003, 1006, and 1007. The communication manager 1132 further includes an SSB bitmap component 1142 that is configured to determine an SSB bitmap based on each of the $1^{st}$ parameter bitmap, the $2^{nd}$ parameter bitmap, and/or the SMTC period as determined by the UE, e.g., as described in connection with 1004. The communication manager 1132 includes an SSB measuring component 1144 that is configured to measure all the SSBs received within the search window, e.g., as described in connection with 1008. The communication manager 1132 includes an SSB measurement database managing component 1146 that is configured to process/prune the measurements associated with the measured SSBs based on at least one of the first parameter bitmap, the second parameter bitmap, the SMTC, or the SSB bitmap, e.g., as described in connection with 1010. The communication manager 1132 includes an SSB measurement reporting component 1148 that is configured to send the measurement results associated with a subset of the measured SSBs, e.g., as described in connection with 1012.

The apparatus may include additional components that perform each of the blocks of the algorithm in the flowcharts of FIGS. 9, 10A, and 10B. As such, each block in the flowcharts of FIGS. 9, 10A, and 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for determining a set of parameters associated with receiving SSBs, the set of parameters including a first parameter bitmap $P_1$ associated with a serving cell, a second parameter bitmap $P_2$ associated with at least one neighbor cell, and an SMTC, means for determining a search window for searching the received SSBs based on the SMTC and at least one of the first parameter bitmap $P_1$ or the second parameter bitmap $P_2$, means for measuring SSBs searched during the determined search window, and means for sending, to a base station, the measurement results associated with at least a subset of the measured SSBs. The apparatus 1002 includes means for determining an SSB based on each of the first parameter bitmap $P_1$, the second parameter bitmap $P_2$, and the SMTC, and means for determining the search window based on the SSB bitmap determined based on each of the first parameter bitmap $P_1$, the second parameter bitmap $P_2$, and the SMTC. The apparatus 1002 includes means for determining the SSB bitmap based on at least one of the first parameter bitmap $P_1$ or an intersection of the second parameter bitmap $P_2$ and the SMTC ($P_2 \cap SMTC$), where the search window is determined based on the determined SSB bitmap. The apparatus 1002 includes means for processing or pruning the measured SSBs based on at least one of the first parameter bitmap, the second parameter bitmap, the SMTC, or the SSB bitmap to generate the measurement results associated with at least the subset of the measured SSBs, including means for removing measurements associated with SSBs received from the serving cell in slots that are not indicated to expect SSBs based on the first parameter bitmap $P_1$, and means for removing the measurements associated with the SSBs received from the at least one neighbor cell in slots that are not indicated to expect SSBs based on an intersection of the second parameter bitmap $P_2$ and the SMTC ($P_2 \cap SMTC$). The apparatus 1002 includes means for determining the search window based on each of the first parameter bitmap $P_1$ and the SMTC. The apparatus 1002 includes means for processing/pruning the measurements associated with the measured SSBs based on at least one of the first parameter bitmap $P_1$ or the second parameter bitmap $P_2$ to generate the measurement results associated with at least the subset of the measured SSBs, including means for removing the measurements associated with the SSBs received from the serving cell in slots that are not indicated to expect SSBs based on the first parameter bitmap $P_1$, and means for removing the measurements associated with the SSBs received from the at least one neighbor cell in slots that are not indicated to expect SSBs based on the second parameter bitmap $P_2$. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

As discussed above, the method of generating the SSB bitmap and determining the search window to search for the SSBs. In some aspects, the UE may be on a synchronous network, and the UE may generate the SSB bitmap according to the following formula: ssb_PositionsInBurst∪(ssb_ToMeasure∩SMTC). Accordingly, the intersection operation of (ssb_ToMeasure∩SMTC) may cover the SSBs broadcasted by neighbor cells while minimizing the window to save power, while, the union of the intersection of the ssb_ToMeasure and the SMTC with the ssb_PositionsInBurst may ensure that the SSBs from the UE serving cell are not omitted. The UE may be further configured to prune measurements associated with the measured SSBs. For example, the UE may remove measurements associated with SSBs received from a serving cell in slots that are not expected by the serving cell based on the ssb_PositionsInBurst, and remove the measurements associated with SSBs received from the neighbor cells in slots that are not expected by the neighbor cells based on the intersection of the ssb_ToMeasure and the SMTC (ssb_ToMeasure∩SMTC).

In some aspects, the UE may be on an asynchronous network, and the UE may generate the search window to include the union of the ssb_PositionsInBurst and the SMTC according to the following formula: ssb_PositionsInBurst∪SMTC. The UE may be further configured to prune the measurements associated with the measured SSBs. For example, the UE may remove measurements associated with SSBs received from the serving cell in slots that are not indicated to expect SSBs based on the ssb_PositionsInBurst, and may remove measurements associated with SSBs received from the at least one neighbor cell in slots that are not indicated to expect SSBs based on the ssb_ToMeasure.

According to the above discussion, the UE performing the method of generating the SSB bitmap and determining the search window to use to search for the SSBs may have improved power management with no decrease in performance. Particularly, the UE may configure more reliable beam/cell detection and measurement, have reduced power consumption, and increased UE mobility performance, and further have enhanced robustness by effectively handling various network configurations to avoid RLF. That is, the UE may save power by reducing the size of the search window without losing the detection and measurements of the SSBs of the serving cell. The UE may also be suspended from searching SSBs from irrelevant neighbor cells. Furthermore, the UE may robustly react to bad configurations of the ssb_PositionsInBurst, the ssb_ToMeasure, and the SMTC, and save the power by reducing the search window length while not skipping any of the SSBs from the serving cell.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the at least one processor and the memory configured to determine a set of parameters associated with receive SSBs, the set of parameters including at least one of a first parameter bitmap $P_1$ associated with a serving cell, a second parameter bitmap $P_2$ associated with at least one neighbor cell, or an SMTC, determine a search window for searching the received SSBs based on the SMTC and at least one of the first parameter bitmap $P_1$ or the second parameter bitmap $P_2$, measure SSBs searched during the determined search window, and sending, to a base station, measurement results associated with at least a subset of the measured SSBs.

Aspect 2 is the apparatus of aspect 1, where the first parameter bitmap $P_1$ is an SSB positions-in-burst (ssb_PositionsInBurst) bitmap associated with the serving cell, and the second parameter bitmap P2 is an SSB-to-measure (ssb_ToMeasure) bitmap associated with at least one neighbor cell.

Aspect 3 is the apparatus of any of aspects 1 and 2, where at least one neighbor cell is synchronized with the serving cell, and the at least one processor and the memory configured to determine the search window are further configured to determine an SSB bitmap based on the first parameter bitmap $P_1$, the second parameter bitmap $P_2$, and the SMTC, and determine the search window based on the determined SSB bitmap.

Aspect 4 is the apparatus of aspect 3, where the at least one processor and the memory configured to determine the SSB bitmap are further configured to determine the SSB bitmap is determined based on the first parameter bitmap $P_1$ or an intersection of the second parameter bitmap $P_2$ and the SMTC ($P_2 \cap$ SMTC), where the search window is determined based on the determined SSB bitmap.

Aspect 5 is the apparatus of aspect 4, where the at least one processor and the memory configured to determine the SSB bitmap are further configured to determine the SSB bitmap based on the first parameter bitmap $P_1$ or an intersection of the second parameter bitmap $P_2$ and the SMTC ($P_2 \cap$ SMTC), where the search window is determined based on the determined SSB bitmap.

Aspect 6 is the apparatus of aspect 5, where the search window extends from a first slot indicated in the SSB bitmap for measuring the SSBs to the last slot indicated in the SSB bitmap for measuring the SSBs.

Aspect 7 is the apparatus of any of aspects 3 to 6, where the search window is determined to include fewer slots than the SMTC, the same number of slots as the SMTC, or a greater number of slots as the SMTC.

Aspect 8 is the apparatus of any of aspects 3 to 7, where the at least one processor and the memory are further configured to process the measured associated with the measured SSBs based on at least one of the first parameter bitmap, the second parameter bitmap, the SMTC, or the SSB bitmap.

Aspect 9 is the apparatus of aspect 8, where the at least one processor and the memory configured to process the measurements associated with the measured SSBs are configured to prune the measurements associated with the measured SSBs based on at least one of the first parameter bitmap, the second parameter bitmap, the SMTC, or the SSB bitmap to generate the measurement results associated with at least the subset of the measured SSBs.

Aspect 10 is the apparatus of aspect 9, where bits in each of the first parameter bitmap $P_1$ and the second parameter bitmap $P_2$ indicate whether SSBs are expected in particular slots, and the at least one processor and the memory configured to prune the measurements associated with the measured SSBs are further configured to remove measurements associated with SSBs received from the serving cell in slots that are not indicated to expect an SSB based on the first parameter bitmap $P_1$, and remove measurements associated with SSBs received from the at least one neighbor cell in slots that are not indicated to expect an SSB based on the intersection of the second parameter bitmap $P_2$ and the SMTC ($P_2 \cap$ SMTC).

Aspect 11 is the apparatus of any of aspects 1 and 2, where at least one neighbor cell is not synchronized with the serving cell, and the at least one processor and the memory configured to determine the search window are further configured to determine the search window based on both the first parameter bitmap $P_1$ and the SMTC.

Aspect 12 is the apparatus of aspect 11, where the search window is determined to include a union of the first parameter bitmap $P_1$ or the SMTC.

Aspect 13 is the apparatus of aspect 12, where the search window extends from a first slot indicated in the union of the first parameter bitmap $P_1$ and the SMTC for measuring the SSBs to a last slot indicated in the union of the first parameter bitmap $P_1$ and the SMTC for measuring the SSBs.

Aspect 14 is the apparatus of aspects 11 to 13, where the at least one processor and the memory are further configured to process measurements associated with the measured SSBs based on at least one of the first parameter bitmap $P_1$ or the second parameter bitmap $P_2$.

Aspect 15 is the apparatus of aspect 14, where the at least one processor and the memory configured to process the measurements associated with the measured SSBs are further configured to prune the measurements associated with the measured SSBs based on at least one of the first parameter bitmap $P_1$ or the second parameter bitmap $P_2$ to generate the measurement results associated with at least the subset of the measured SSBs.

Aspect 16 is the apparatus of aspect 15, where bits in each of the first parameter bitmap $P_1$ and the second parameter bitmap $P_2$ indicate whether SSBs are expected in particular slots, and the at least one processor and the memory configured to prune the measurements associated with the measured SSB are further configured to remove measurements associated with SSBs received from the serving cell in slots that are not indicated to expect an SSB based on the first parameter bitmap $P_1$, and remove measurements associated with SSBs received from the at least one neighbor cell in slots that are not indicated to expect an SSB based on the second parameter bitmap $P_2$.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer-executable code, where the code when executed by a processor causes the processor to implement any of aspects 1 to 16.

What is claimed is:

1. An apparatus for wireless communication at a user equipment (UE), comprising:
   a memory; and
   at least one processor coupled to the memory, the at least one processor and the memory configured to:
   determine a set of parameters associated with receiving synchronization signal blocks (SSBs), the set of parameters including a first parameter bitmap $P_1$ associated with a serving cell, a second parameter bitmap $P_2$ associated with at least one neighbor cell, and an SSB measurement timing configuration (SMTC);
   determine a search window for searching the received SSBs associated with the serving cell and the at least one neighbor cell based on a union of the first parameter bitmap $P_1$ and an intersection of the second parameter bitmap $P_2$ and the SMTC;
   measure SSBs searched during the determined search window; and
   send, to a base station, measurement results associated with at least a subset of the measured SSBs.

2. The apparatus of claim 1, further comprising a transceiver coupled to the at least one processor.

3. The apparatus of claim 1, wherein the first parameter bitmap P1 is an SSB positions-in-burst bitmap associated with the serving cell, and the second parameter bitmap P2 is an SSB-to-measure bitmap associated with the at least one neighbor cell.

4. The apparatus of claim 1, wherein the at least one neighbor cell is synchronized with the serving cell, and the at least one processor and the memory configured to determine the search window are further configured to:
   determine an SSB bitmap based on the first parameter bitmap $P_1$, the second parameter bitmap $P_2$, and the SMTC; and
   determine the search window based on the determined SSB bitmap.

5. The apparatus of claim 4, wherein the at least one processor and the memory configured to determine the SSB bitmap are further configured to:
   determine the SSB bitmap based on the first parameter bitmap $P_1$ or the intersection of the second parameter bitmap $P_2$ and the SMTC ($P_2 \cap$ SMTC), wherein to determine the search window, the at least one processor and the memory are configured to determine the search window based on the determined SSB bitmap.

6. The apparatus of claim 5, wherein the at least one processor and the memory configured to determine the SSB bitmap are further configured to:
  determine the SSB bitmap based on $P_1 \cup (P_2 \cap SMTC)$, which is the union of the first parameter bitmap $P_1$ and the intersection of the second parameter bitmap $P_2$ and the SMTC ($P_2 \cap SMTC$), wherein to determine the search window, the at least one processor and the memory are configured to determine the search window is determined based on the determined SSB bitmap.

7. The apparatus of claim 6, wherein the search window extends from a first slot indicated in the SSB bitmap for measuring the SSBs to a last slot indicated in the SSB bitmap for measuring the SSBs.

8. The apparatus of claim 4, wherein to determine the search window, the at least one processor and the memory are configured to determine the search window to include less slots than the SMTC, a same number of slots as the SMTC, or a greater number of slots as the SMTC.

9. The apparatus of claim 4, wherein the at least one processor and the memory are further configured to process the measurements associated with the measured SSBs based on at least one of the first parameter bitmap $P_1$, the second parameter bitmap $P_2$, the SMTC, or the SSB bitmap.

10. The apparatus of claim 9, wherein the at least one processor and the memory configured to process the measured SSBs are configured to:
  prune the measurements associated with the measured SSBs based on at least one of the first parameter bitmap $P_1$, the second parameter bitmap $P_2$, the SMTC, or the SSB bitmap to generate the measurement results associated with at least the subset of the measured SSBs.

11. The apparatus of claim 10, wherein bits in each of the first parameter bitmap $P_1$ and the second parameter bitmap $P_2$ indicate whether SSBs are expected in particular slots, and the at least one processor and the memory configured to prune the measurements associated with the measured SSBs are configured to:
  remove measurements associated with SSBs received from the serving cell in slots that are not indicated to expect an SSB based on the first parameter bitmap $P_1$; and
  remove measurements associated with SSBs received from the at least one neighbor cell in slots that are not indicated to expect an SSB based on the intersection of the second parameter bitmap $P_2$ and the SMTC ($P_2 \cap SMTC$).

12. The apparatus of claim 1, wherein the at least one neighbor cell is not synchronized with the serving cell, and the at least one processor and the memory configured to determine the search window are further configured to determine the search window based on both the first parameter bitmap $P_1$ and the SMTC.

13. The apparatus of claim 1, wherein the search window extends from a first slot indicated in the union of the first parameter bitmap $P_1$ and the SMTC for measuring the SSBs to a last slot indicated in the union of the first parameter bitmap $P_1$ and the SMTC for measuring the SSBs.

14. The apparatus of claim 12, wherein the at least one processor and the memory are further configured to process measurements associated with the measured SSBs based on at least one of the first parameter bitmap $P_1$ and the second parameter bitmap $P_2$.

15. The apparatus of claim 14, wherein the at least one processor and the memory configured to process the measurements associated with the measured SSBs are configured to prune the measurements associated with the measured SSBs based on at least one of the first parameter bitmap $P_1$ or the second parameter bitmap $P_2$ to generate the measurement results associated with at least the subset of the measured SSBs.

16. The apparatus of claim 15, wherein bits in each of the first parameter bitmap $P_1$ and the second parameter bitmap $P_2$ indicate whether SSBs are expected in particular slots, and the at least one processor and the memory configured to prune the measurements associated with the measured SSBs are further configured to:
  remove measurements associated with SSBs received from the serving cell in slots that are not indicated to expect an SSB based on the first parameter bitmap $P_1$; and
  remove measurements associated with SSBs received from the at least one neighbor cell in slots that are not indicated to expect an SSB based on the second parameter bitmap $P_2$.

17. A method of wireless communication at a user equipment (UE), comprising:
  determining a set of parameters associated with receiving synchronization signal blocks (SSBs), the set of parameters including a first parameter bitmap $P_1$ associated with a serving cell, a second parameter bitmap $P_2$ associated with at least one neighbor cell, and an SSB measurement timing configuration (SMTC);
  determining a search window for searching the received SSBs associated with the serving cell and the at least one neighbor cell based on a union of the first parameter bitmap $P_1$ and an intersection of the second parameter bitmap $P_2$ and the SMTC;
  measuring SSBs searched during the determined search window; and
  sending, to a base station, measurement results associated with at least a subset of the measured SSBs.

18. The method of claim 17, wherein the first parameter bitmap P1 is an SSB positions-in-burst bitmap associated with the serving cell, and the second parameter bitmap P2 is an SSB-to-measure bitmap associated with the at least one neighbor cell.

19. The method of claim 17, wherein the at least one neighbor cell is synchronized with the serving cell, and the determining the search window further comprises:
  determining an SSB bitmap based on the first parameter bitmap $P_1$, the second parameter bitmap $P_2$, and the SMTC; and
  determining the search window based on the determined SSB.

20. The method of claim 19, wherein the determining the SSB bitmap further comprises:
  determining the SSB bitmap based on the first parameter bitmap $P_1$ or the intersection of the second parameter bitmap $P_2$ and the SMTC ($P_2 \cap SMTC$), wherein the search window is determined based on the determined SSB bitmap.

21. The method of claim 20, wherein the determining the SSB bitmap further comprises: determining the SSB bitmap based on $P_1 \cup (P_2 \cap SMTC)$, which is the union of the first parameter bitmap $P_1$ and the intersection of the second parameter bitmap $P_2$ and the SMTC ($P_2 \cap SMTC$), wherein the search window is determined based on the determined SSB bitmap.

22. The method of claim 21, wherein the search window extends from a first slot indicated in the SSB bitmap for measuring the SSBs to a last slot indicated in the SSB bitmap for measuring the SSBs.

23. The method of claim 19, wherein the search window is determined to include less slots than the SMTC, a same number of slots as the SMTC, or a greater number of slots as the SMTC.

24. The method of claim 19, further comprising processing the measurements associated with the measured SSBs based on at least one of the first parameter bitmap, the second parameter bitmap, the SMTC, or the SSB bitmap.

25. The method of claim 24, wherein the processing the measurements associated with the measured SSBs further comprises pruning the measurements associated with the measured SSBs based on at least one of the first parameter bitmap, the second parameter bitmap, the SMTC, or the SSB bitmap to generate the measurements associated with at least the subset of the measured SSBs.

26. The method of claim 25, wherein bits in each of the first parameter bitmap $P_1$ and the second parameter bitmap $P_2$ indicate whether SSBs are expected in particular slots, and the pruning the measurements associated with the measured SSBs comprises:
removing measurements associated with SSBs received from the serving cell in slots that are not indicated to expect an SSB based on the first parameter bitmap $P_1$; and
removing measurements associated with SSBs received from the at least one neighbor cell in slots that are not indicated to expect an SSB based on the intersection of the second parameter bitmap $P_2$ and the SMTC ($P_2 \cap SMTC$).

27. The method of claim 17, wherein the at least one neighbor cell is not synchronized with the serving cell, and the determining the search window further comprises: determining the search window based on both the first parameter bitmap $P_1$ and the SMTC.

28. An apparatus for wireless communication at a user equipment (UE), comprising:
means for determining a set of parameters associated with receiving synchronization signal blocks (SSBs), the set of parameters including a first parameter bitmap $P_1$ associated with a serving cell, a second parameter bitmap $P_2$ associated with at least one neighbor cell, and an SSB measurement timing configuration (SMTC);
means for determining a search window for searching the received SSBs associated with the serving cell and the at least one neighbor cell based on a union of the first parameter bitmap $P_1$ and an intersection of the second parameter bitmap $P_2$ and the SMTC;
means for measuring SSBs searched during the determined search window; and
means for sending, to a base station, measurement results associated with at least a subset of the measured SSBs.

29. A non-transitory computer-readable medium storing computer executable code at a user equipment (UE), the code when executed by a processor of the UE cause the processor to:
determine a set of parameters associated with receiving synchronization signal blocks (SSBs), the set of parameters including a first parameter bitmap $P_1$ associated with a serving cell, a second parameter bitmap $P_2$ associated with at least one neighbor cell, and an SSB measurement timing configuration (SMTC);
determine a search window for searching received SSBs associated with the serving cell and the at least one neighbor cell based on a union of the first parameter bitmap $P_1$ and an intersection of the second parameter bitmap $P_2$ and the SMTC;
measure SSBs searched during the determined search window; and
send, to a base station, measurement results associated with at least a subset of the measured SSBs.

30. The method of claim 17, wherein the search window extends from a first slot indicated in the union of the first parameter bitmap $P_1$ and the SMTC for measuring the SSBs to a last slot indicated in the union of the first parameter bitmap $P_1$ and the SMTC for measuring the SSBs.

31. The method of claim 27, further comprising:
processing measurements associated with the measured SSBs based on at least one of the first parameter bitmap $P_1$ and the second parameter bitmap $P_2$.

32. The method of claim 31, wherein processing the measurements associated with the measured SSBs comprises pruning the measurements associated with the measured SSBs based on at least one of the first parameter bitmap $P_1$ or the second parameter bitmap $P_2$ to generate the measurement results associated with at least the subset of the measured SSBs.

33. The method of claim 32, wherein bits in each of the first parameter bitmap $P_1$ and the second parameter bitmap $P_2$ indicate whether SSBs are expected in particular slots, and pruning the measurements associated with the measured SSBs comprises:
removing measurements associated with SSBs received from the serving cell in slots that are not indicated to expect an SSB based on the first parameter bitmap $P_1$; and
removing measurements associated with SSBs received from the at least one neighbor cell in slots that are not indicated to expect an SSB based on the second parameter bitmap $P_2$.

* * * * *